United States Patent [19]
Oura et al.

[11] Patent Number: 6,128,294
[45] Date of Patent: Oct. 3, 2000

[54] NETWORK CONNECTING APPARATUS

[75] Inventors: Tetsuo Oura, Yokohama; Naoya Ikeda, Ebima, both of Japan

[73] Assignee: Hitachi, Ltd., Tokyo, Japan

[21] Appl. No.: 08/829,238

[22] Filed: Mar. 31, 1997

[30] Foreign Application Priority Data

Apr. 5, 1996 [JP] Japan ................................. 8-083546

[51] Int. Cl.[7] .............................. H04L 12/28; G06F 13/00
[52] U.S. Cl. .................. 370/389; 370/392; 370/469; 709/245; 340/825.07
[58] Field of Search .................................. 370/389, 390, 370/392, 401, 400, 469; 340/825.52, 825.07; 395/200.58; 364/241, 242; 709/245, 246

[56] References Cited

U.S. PATENT DOCUMENTS 5,526,489  6/1996  Nilakantan et al. ............. 395/200.58
5,751,961  5/1998  Smyk ............................... 709/245

OTHER PUBLICATIONS

RFC 826, David C. Plummer, Nov. 1982, pp. 1–9.
Douglas E. Comer, "Internetworking With TCP/IP Principles, Protocols, and Architecture", published by Prentice–Hall, Inc., 1988.
Douglas E. Comer, "Internatworking with TCP/IP vol. 1, Principles, Protocols, and Architecture", published by Prentice Hall, 1995.

*Primary Examiner*—Alpus H. Hsu
*Assistant Examiner*—Afsar M. Qureshi
*Attorney, Agent, or Firm*—Beall Law Office

[57] ABSTRACT

The network connecting apparatus implements an address resolution control method in conjunction with a switch on a network having a plurality of sub-nets within a single physical segment. The network connecting apparatus includes a switch 20 constituted by port control units 31 through 34, a switch control unit 35, a managing unit 36 and an address managing table 37. The switch 20 is supplemented innovatively with an address resolution control unit 47 and with an ARP request packet detecting unit 382 in a destination port discriminating unit 38 of the switch control unit 35.

20 Claims, 21 Drawing Sheets

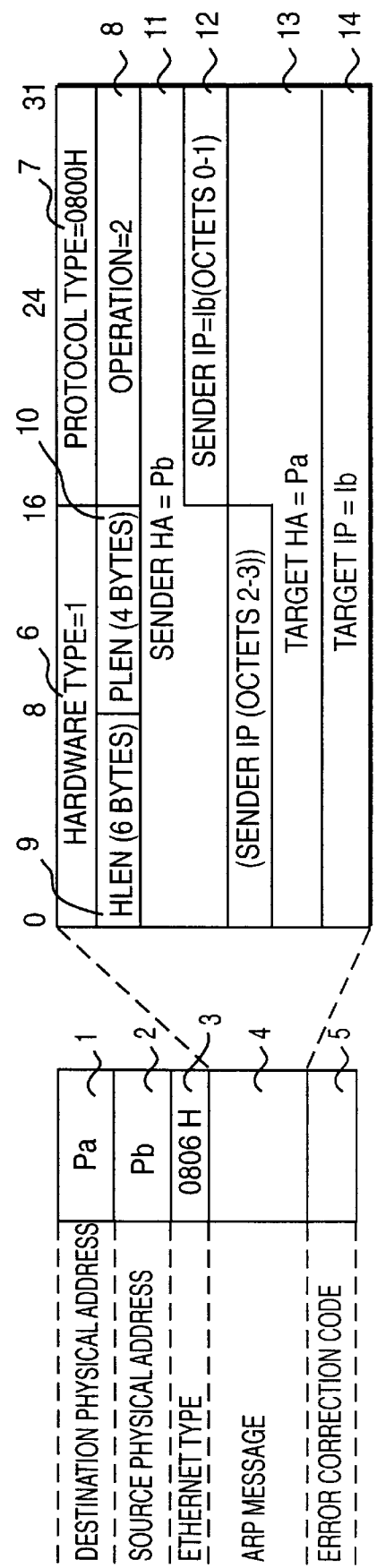

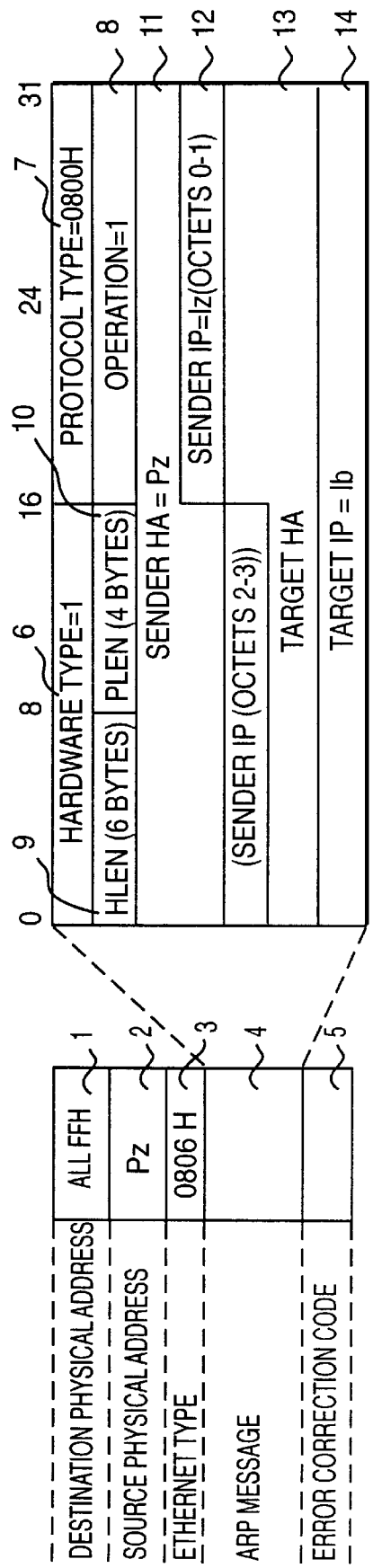

ADDRESS MANAGING TABLE

| PORT NO. | PHYSICAL ADDRESS | IP ADDRESS | VALIDITY FLAG |
|---|---|---|---|
| 21 | Pa | Ia | 1 |
| 22 | | | 0 |
| 23 | Pb | Ib | 1 |
| 24 | | | 0 |
| ⋮ | ⋮ | ⋮ | ⋮ |
| z (OWN PORT) | Pz | Iz | 1 |

ADDRESS MANAGING TABLE

| PORT NO. | PHYSICAL ADDRESS | IP ADDRESS | VALIDITY FLAG |
|---|---|---|---|
| 21 | | | 0 |
| 22 | | | 0 |
| 23 | Pb | Ib | 1 |
| 24 | | | 0 |
| ⋮ | ⋮ | ⋮ | ⋮ |
| z (OWN PORT) | Pz | Iz | 1 |

NETWORK CONNECTING APPARATUS

FIELD OF THE INVENTION

The present invention relates to a network connecting apparatus employing a switch in a manner to reduce packet flow over a network and increase security of data transfer.

BACKGROUND OF THE INVENTION

Address Resolution Protocol (hereinafter referred to as ARP) is stipulated under RFC 826, by David C. Plummer (November 1982). As such, the ARP constitutes a standard in the Transmission Control Protocol/Internet Protocol (TCP/IP). Specifically, the ARP is a protocol used by a source host to acquire a physical address of a destination host. A general description is provided in a book by Douglas E. Comer entitled "Internetworking With TCP/IP Principles, Protocols, and Architecture", published by Prentice-Hall, Inc. (1988). While the internet protocol (IP) address may be known, the media access control (MAC) address may not be known. The MAC address is the specific address of a host.

The format of packets used under the ARP will now be described with reference to FIG. 1. FIG. 1 shows the format of packets used for the Ethernet (registered trademark of Fuji Xerox Co., Ltd.). The Ethernet packet format comprises a destination physical address 1, a source physical address 2, an Ethernet type (value: 0806H; where H stands for hexadecimal) 3, an ARP message 4 and an error correction code 5.

FIG. 2 depicts the format of the ARP message 4, wherein a hardware type field 6 designates the type of hardware interface from which the source host requests an acknowledgment. For the Ethernet, the hardware type is represented by the value 1. Likewise, a protocol type field 7 specifies the type of high level protocol address used by the source host. For an IP address, the protocol type is represented by the value 0800H. An operation field 8 indicates an ARP request (value: 1) or an ARP acknowledgment (value: 2). An HLEN field 9 and a PLEN field 10 designate a high level protocol address length (4 bytes for the IP) and a physical address length (6 bytes for the Ethernet), respectively. A sender HA field 11 and a sender IP field 12 denote the physical address and IP address of the source host, respectively. A target HA field 13 and a target IP field 14 specify the physical address and IP address of the destination host, respectively. The target HA field 13 is to be set by the destination host upon ARP acknowledgment.

The operation of the ARP will now be described with reference to FIGS. 3A and 3B. Reference characters A15, B16, X17 and Y18 denote hosts. Each host is connected to the same physical segment on the Ethernet 19. When the host A15 (IP address: Ia; physical address: Pa) is to obtain the physical address of the host B16 (IP address: Ib; physical address: Pb), the host A15 broadcasts an ARP request packet of FIG. 4 (in the manner shown in FIG. 3A). The destination physical address "all FFH" in the ARP request packet of FIG. 4 indicates that the packet is to be broadcast. In so doing, the host A15 requests the host B16 to return its physical address Pb. Although all hosts including the host B16 receive the same request, only the host B16 recognizes the IP address in the requesting packet. In response, the host B16 sends to the host A15 an ARP reply packet including its own physical address Pb (see FIG. 3B). This is how the host A15 acquires the physical address of the host B16.

Of course, it is possible that all of the hosts place ARP request packets onto the network whenever necessary, thereby increasing the loads on the network. Such events are circumvented by a scheme under which the ARP request packet broadcast by, for example, host A15 is received by the other hosts caching the IP address Ia and physical address Pa of the host A15.

SUMMARY OF THE INVENTION

The present inventors have recognized that the network connecting apparatus of prior art and its attempted solutions suffers from the following problems. In the network configuration of FIGS. 3A and 3B, the hosts X17 and Y18 cannot use the network while the hosts A15 and B16 are communicating with each other. The disadvantage of such limited availability of the network band has been resolved by a switch-equipped network.

A typical configuration of the switch-equipped network is shown in FIG. 6. In FIG. 6, a switch 20 has a plurality of ports 21 through 24. Through each port, switch 20 is connected to the applicable host independently on a one-to-one basis. The switch 20 checks the destination physical address of each received packet and sends the packet to only the port which is connected to the host having the same physical address as that of the packet. The switch 20 may have a buffer or a plurality of buses so that a plurality of packets for different destinations may be transferred concurrently. These arrangements allow the hosts X17 and Y18 to communicate with each other while the hosts A15 and B16 are in communication.

The execution of the ARP in such a setup will now be described with reference to FIG. 7. In FIG. 7, the host A15 sends the ARP request packet of FIG. 4 to the switch 20 in order to obtain the physical address of the host B16. The switch 20 checks the destination physical address of the received ARP request packet and recognizes that the packet with its "all FFH" destination address is a packet to be broadcast. Accordingly, the switch 20 broadcasts the packet to all hosts 16 through 18 except the host A15 through all ports 22 to 24 except the port 21. The trouble with this setup is that while the host A15 is sending the ARP request packet over the network, the other hosts 16 through 18 cannot use the network and thus fail to take full advantage of the function of switch 20.

A variation of the switch-equipped network is a virtual network constituting logical segments free of physical segment constraints. The virtual network is intended to improve the ease of relocating or adding hosts on the network and to enhance data transfer security. A typical virtual network configuration will now be described with reference to FIG. 8. In this example, the hosts A15 and B16 are allocated to a group A15 and the hosts X17 and Y18 to a group B26. Allocation of the hosts to the groups A15 and B26 may be determined for each port by suitably initializing the switch 20, or may be recorded by use of IP sub-nets. These methods, however, require changing the settings every time a host is relocated or added. It is preferred to instead use a method whereby the configured ports are grouped on the basis of the source physical address or source IP address of each packet received by the switch 20.

Execution of the ARP using the latter method will now be described with reference to FIG. 9. It is assumed here that the hosts in their initial state are yet to communicate with one another. Thus, upon initialization, the switch 20 is yet to recognize which host is connected to which port. It is also assumed that the switch 20 has settings designating the group A25 as the host having the IP address of a sub-net A and the group B26 as the host having the IP address of a sub-net B. In this setup, as in the earlier example, the host A15 sends the ARP request packet of FIG. 4 to the switch 20 in order to acquire the physical address of the host B16. The switch 20 checks the destination physical address of the received ARP request packet and recognizes that the packet with its destination address "all FFH" is a packet to be broadcast. The switch 20 then broadcasts the packet to all hosts 16 through 18 except the host A15 through all ports 22 to 24 except the port 21. The trouble with this setup is that although the hosts X17 and Y18 belong to a group different from that of the host A15, they may receive the ARP request packet sent from the host A15 and know the physical address and IP address of the host A15. This feature can lower the security of data transfer over the network.

In order to overcome the above-mentioned problems in the prior art, the present inventors have arrived at the present invention which is described below. First, the constitution of the conventional switch is described with reference to FIG. 10. The switch 20 comprises port control units 31 through 34, a switch control unit 35, a managing unit 36 and an address managing table 37. Before the functions of the switch components are described, the constitution of the address managing table 37 and the format of packets handled by the switch 20 are outlined below. FIG. 11 shows a typical constitution of the address managing table 37. The table 37 comprises a port column 40 having port numbers, a physical address column 41 made up of physical addresses corresponding to the port numbers in the port column 40, and an IP address column 42 including IP addresses corresponding to the listed ports. The settings of FIG. 11 indicate a case where the physical address 41 and IP address 42 of each of the ports are known. Whether or not any given element in the table is valid is indicated by a flag in a validity flag column 401. A flag "1" means the applicable element is valid and a flag "0" indicates that the element in question is invalid. A port z identifies the switch's own port.

FIG. 12 illustrates the format of packets handled by the switch 20. The packet comprises a header part 43 and a packet part 44, the latter part accommodating the packet proper to be transferred over the network. The header part 43 is composed of a receiving port identifier 45 and a destination port identifier 46. The bits making up each of the identifiers 45 and 46 are assigned successively to the configured ports on a bit-for-port basis, the least significant bit being assigned to the smallest-numbered port. The components of the switch 20 work as follows: each of the port control units, upon receipt of a packet from a network, attaches the header part to the packet, sets the bit of its own port in the receiving port identifier 45, and forwards the packet to a destination port discriminating unit 38. When receiving a packet from a destination port appointing unit 39, the applicable port control unit forwards the received packet onto the applicable network. Given the destination physical address 1 in the packet, the destination port discriminating unit 38 searches the address managing table 37 for the applicable destination port number. With the destination port number retrieved, the destination port discriminating unit 38 sets the corresponding bit in the destination port identifier 46 of the header part 43. If the destination physical address 1 is "all FFH," the destination port discriminating unit 38 sets those bits in the destination port identifier 46 which corresponds to all ports except the port whose bit has already been set. The destination port discriminating unit 38 includes a reception queue 381 for temporarily accommodating packets received from a plurality of ports. The destination port appointing unit 39 transfers each packet to all ports whose bits are set in the destination port identifier 46 of the header part 43. On transferring a packet to the ports, the destination port appointing unit 39 removes the header part 43 from the packet so that the packet part 44 alone will be sent. The managing unit 36 controls the switch 20 as a whole and updates the address managing table 37 in accordance with the contents of the received ARP request packet.

FIG. 13 illustrates an overall constitution of the switch 20 according to the present invention. The setup of FIG. 13 is a variation of what is shown in FIG. 10 and is supplemented with an address resolution control unit 47 and with an ARP request packet detecting unit 382 included in the destination port discriminating unit 38. The ARP request packet detecting unit 382 recognizes a transferred packet and, with the packet found to be an ARP request packet, clears all the bits in the destination port identifier 46 of the packet. The ARP request packet is then sent from the destination port appointing unit 39 to the address resolution control unit 47. In turn, the address resolution control unit 47 generates a packet and transfers it to the destination port appointing unit 39. The managing unit 30 transfers an ARP reply packet to the address resolution control unit 47. While operating, the address resolution control unit 47 references the address managing table 37.

The operation of the components embodying the invention will now be described with reference to some of the accompanying drawings. An ARP request packet received through a given port is transferred from the corresponding port control unit to the destination port discriminating unit 38. If the destination physical address 1 of the packet is found to be "all FFH," the destination port discriminating unit 38 passes the packet on to the ARP request packet detecting unit 382. The ARP request packet detecting unit 382 checks the received packet and, finding that the packet is an ARP request packet, clears all bits in the destination port identifier 46 of the packet to zero and passes the packet on to the destination port appointing unit 39. Since the bits in the destination port identifier 46 of the received packet are all zero, the destination port appointing unit 39 forwards the packet to the address resolution control unit 47.

FIG. 15 is a flowchart of steps performed by the address resolution control unit 47. In step 53, the address resolution control unit 47 starts carrying out ARP request packet processing. A check is first made to see if the destination IP address (target IP) 14 of the received packet is recorded in the address managing table 37 (step 54). If the destination IP address (target IP) 14 is found to be recorded in the address managing table 37, a check is made to see if the source host address is recorded in the address managing table 37 (step 501). If the source host address is found to be recorded in the address managing table 37, the address resolution control unit 47 retrieves the physical address of the destination host from the table, embeds the physical address into the received packet so as to generate an ARP reply packet, and copies the receiving port identifier 45 to the destination port identifier 46 (step 55) in the packet. Thereafter the ARP reply packet is passed on to the destination port appointing unit 39 (step 56). The destination port appointing unit 39 forwards the received packet to the applicable port control unit in accordance with the destination port identifier 46 of the packet. The ARP reply packet is sent from the corresponding port control unit over the network to the host that transmitted the ARP request packet.

If the source host address is not found in the address managing table 37 in step 501, the address resolution control unit 47 searches the address managing table 37 for the port of the destination host and sets to "1" the corresponding bit in the destination port identifier 46 (step 502). After that, the packet is passed on to the destination port appointing unit 39 (step 56). The destination port appointing unit 39 forwards the received packet to the applicable port control unit in accordance with the destination port identifier 46 of the packet. The ARP request packet is sent from the corresponding port control unit to the destination host over the network.

If it is found that the destination IP address (target IP) 14 of the packet received by the address resolution control unit 47 is not recorded in the address managing table 37, the address resolution control unit 47 generates a substitute ARP request packet by which the switch 20 obtains the physical address of the host represented by the destination IP address (target IP) 14. The address resolution control unit 47 sets "1" to all bits in the destination port identifier 46 of the received packet except the bits set in the receiving port identifier 45 and the bit (z) corresponding to the switch 20 (step 57). The substitute ARP request packet thus generated is transferred to the destination port appointing unit 39 (step 56). The destination port appointing unit 39 passes the received packet on to the applicable port control units in accordance with the destination port identifier 46 of the packet. The substitute ARP request packet is output to the networks from all port control units except the port that received the ARP request packet, so that the packets will reach all hosts except the one that sent the ARP request packet. Of the hosts having received the substitute ARP request packets, only the host whose IP address corresponds to the destination IP address (target IP) 14 of the packet sends an ARP reply packet to the switch 20. Upon receipt of the ARP reply packet, the switch 20 transfers the packet from the port control unit in question to the destination port discriminating unit 38. If the destination physical address 1 of the received packet is found to be the address of the switch 20 (i.e., Pz), the destination port discriminating unit 38 sets the most significant bit in the destination port identifier 46 and passes the packet on to the destination port appointing unit 39. With the most significant bit in the destination port identifier 46 found to be set, the destination port appointing unit 39 transfers the packet to the managing unit 36. The managing unit 36 checks the contents of the packet, verifies that the packet is an ARP reply packet, and updates the address managing table 37 in accordance with the contents of the ARP message in the packet. The managing unit 36 then sends the packet to the address resolution control unit 47. Upon receipt of the packet (step 58), the address resolution control unit 47 replaces the destination physical address 1 and target HA field 13 in the packet with the physical address of the host which transmitted the ARP request packet. The address resolution control unit 47 also replaces the target IP address 14 of the packet with the IP address of the host having sent the ARP request packet. In addition, the address resolution control unit 47 sets to "1" that bit in the destination port identifier 46 which represents the port through which the ARP request packet was received earlier (step 59). The packet is then transferred to the destination port appointing unit 39 (step 56). The destination port appointing unit 39 forwards the received packet to the applicable port control unit in accordance with the destination port identifier 46 of the packet. The ARP reply packet is sent from the port control unit in question over the network to the host that transmitted the ARP request packet.

Other objects, features and advantages of the present invention will become more apparent in view of the following detailed description of the preferred embodiments of the invention in connection with the drawings.

BRIEF DESCRIPTION OF THE DRAWINGS

FIG. 20 is an explanatory view of an address managing table for use with the first embodiment of the present invention;

FIG. 21 is an explanatory view of the format of a substitute ARP reply packet for use with the first embodiment of the present invention;

FIG. 24 is an explanatory view of an address managing table for use with the second embodiment of the present invention;

FIG. 25 is an explanatory view of the format of a substitute ARP request packet for use with the second embodiment of the present invention;

DETAILED DESCRIPTION OF THE PREFERRED EMBODIMENTS

Figure 1:
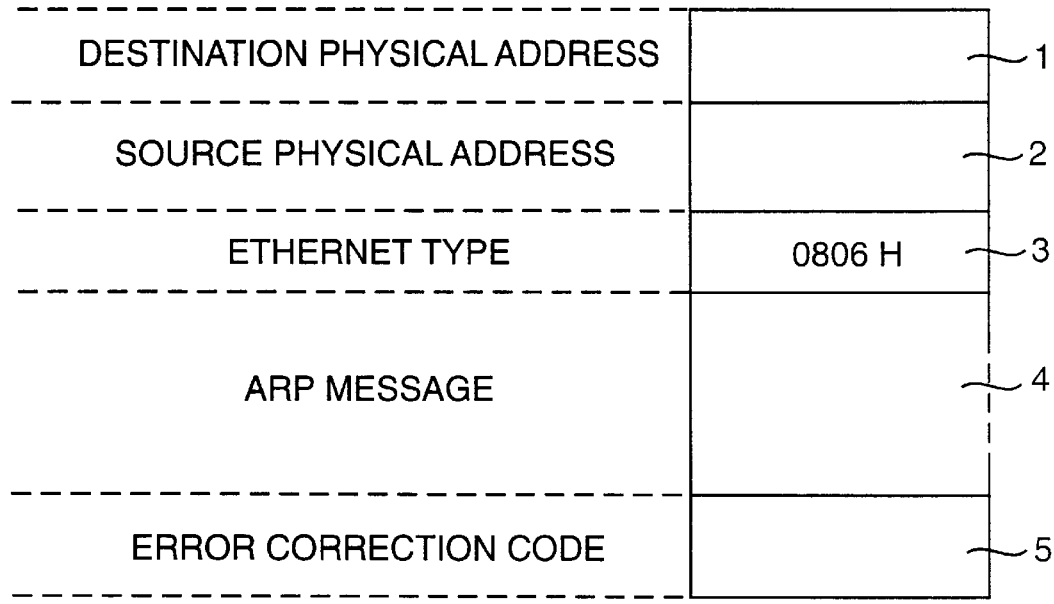
FIG. 1 is an explanatory view of the format of a packet used on the Ethernet.
Figure 2:
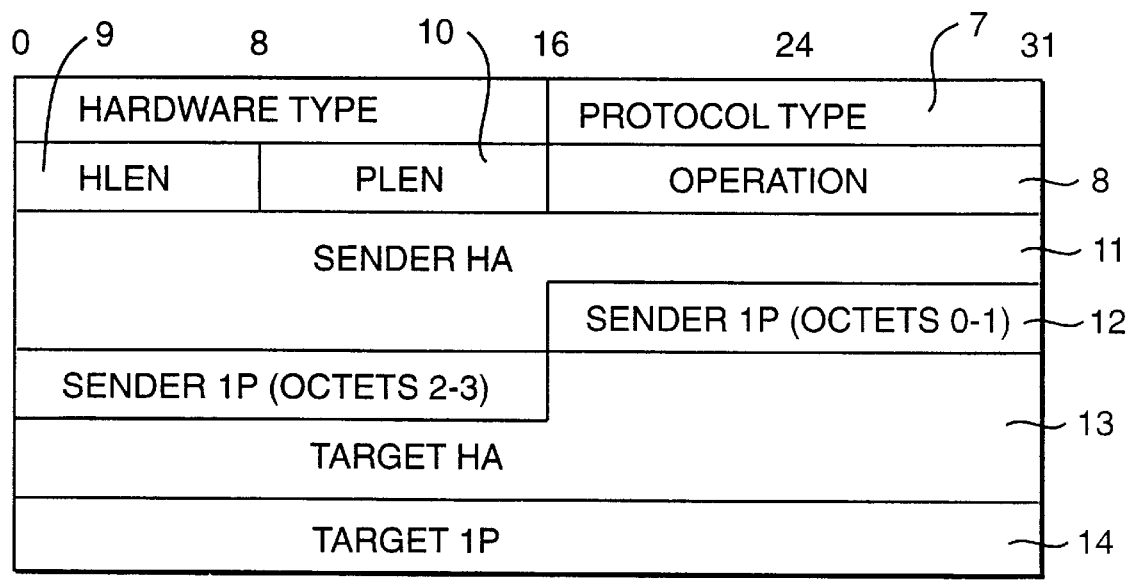
FIG. 2 is an explanatory view of the format of an ARP message.
Figure 3A:
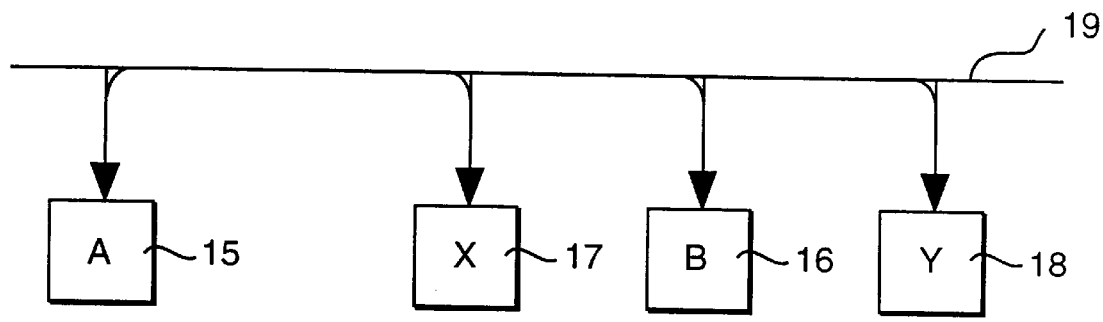
FIGS. 3A and 3B are schematic views showing how the ARP typically works.
Figure 3B:
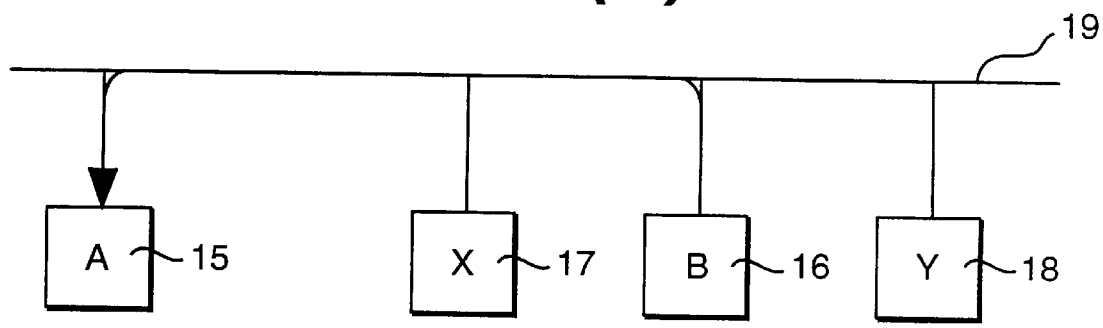
Figure 6:
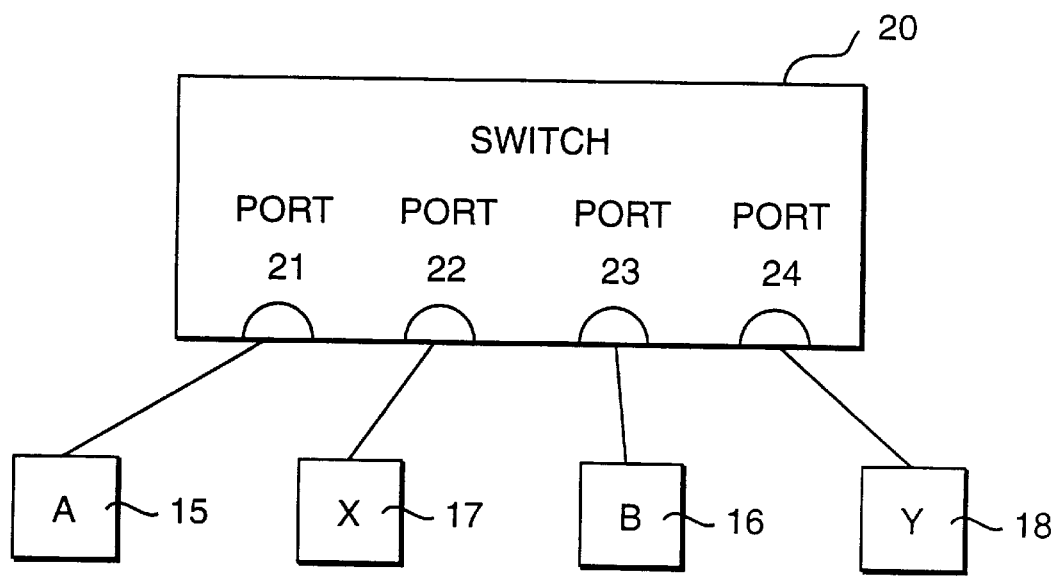
FIG. 6 is a schematic view of a typical switch-connected Ethernet configuration.
Figure 4:
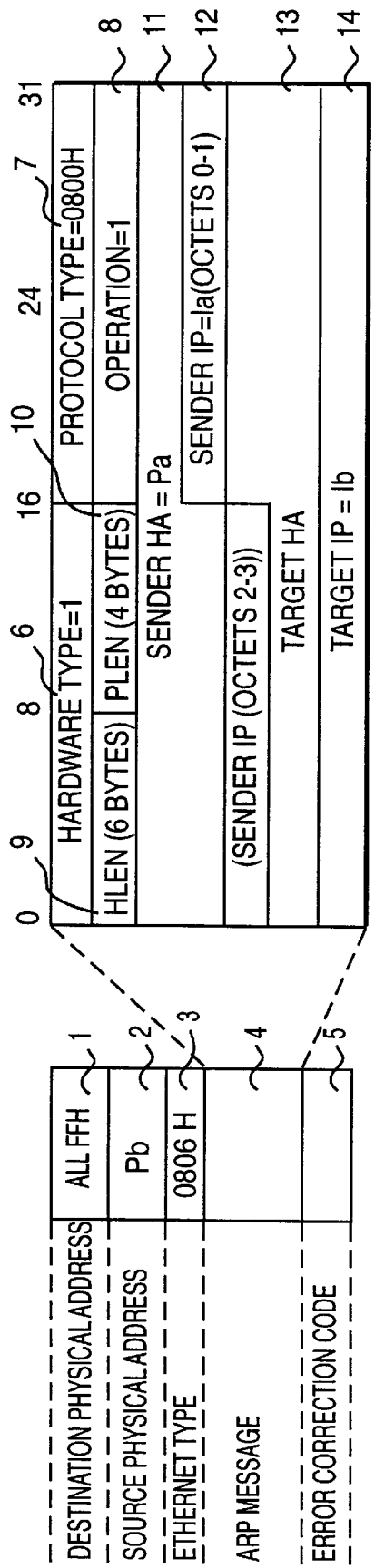
FIG. 4 is an explanatory view of the format of an ARP request.
Figure 5:
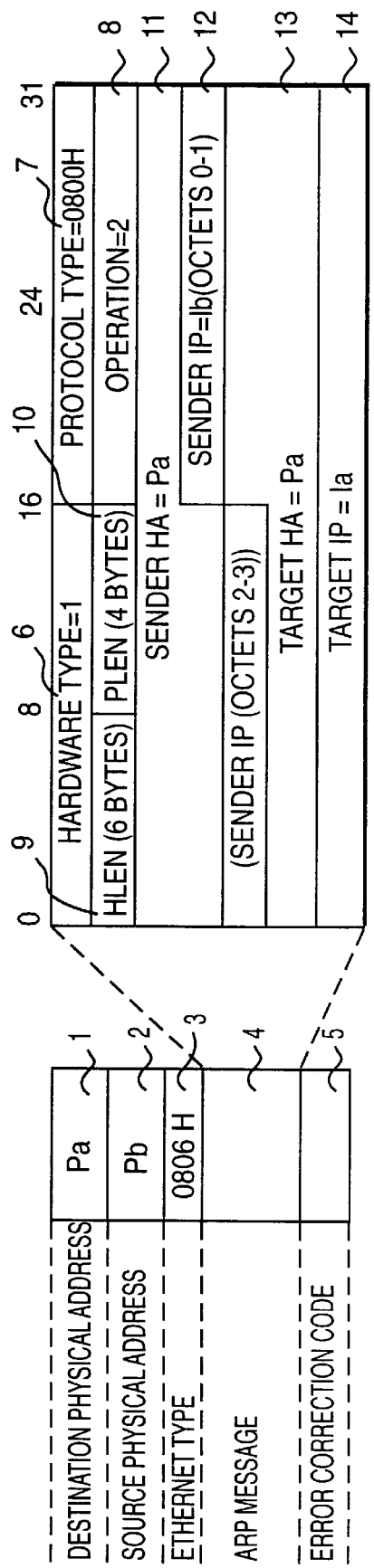
FIG. 5 is an explanatory view of the format of an ARP reply packet.
Figure 7:
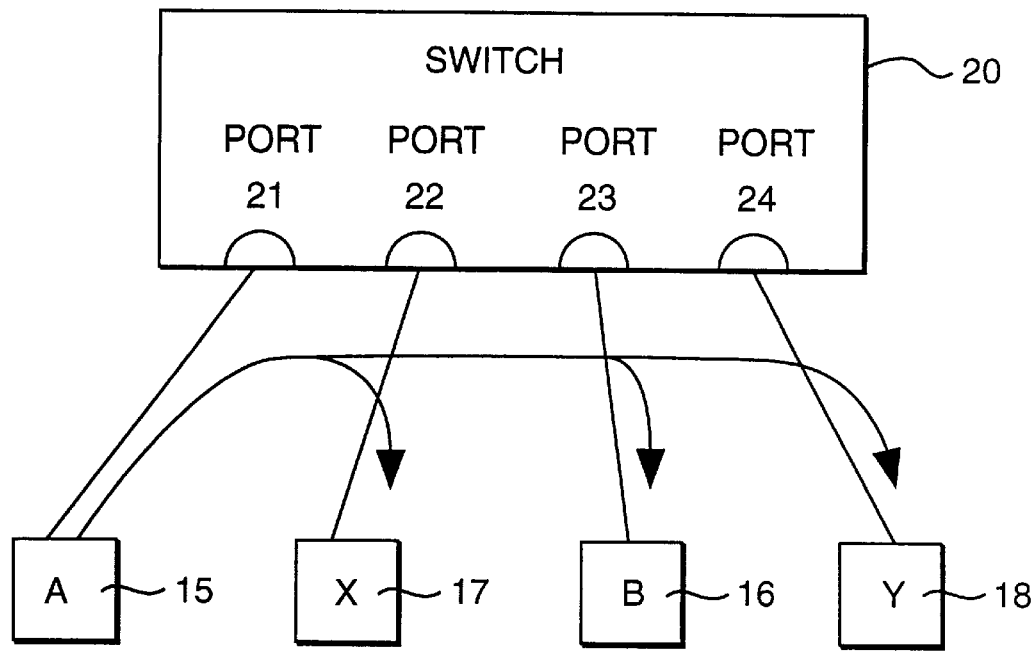
FIG. 7 is a schematic view indicating how the ARP typical works on the switch-connected Ethernet configuration.

The preferred embodiments of the invention will now be described with reference to the accompanying drawings. FIG. 6 shows a typical network configuration to which the embodiments of the invention are applied. In FIG. 6, the switch includes ports 21, 22, 23 and 24 connected to hosts A15, X17, B16 and Y18 respectively via a network each. The network in use is illustratively the Ethernet whose high level protocol is the TCP/IP. Given the destination address of each packet, switch 20 accordingly determines the port through which to transfer the packet. Switch 20 may transfer packets between a plurality of ports with the exception of the packets destined to the same port. During its operation, switch 20 does not rewrite the contents of packets except in another embodiment, to be described later. The switch 20 has a virtual network configuring function for setting logical segments different from the physical segments in place.

Figure 8:
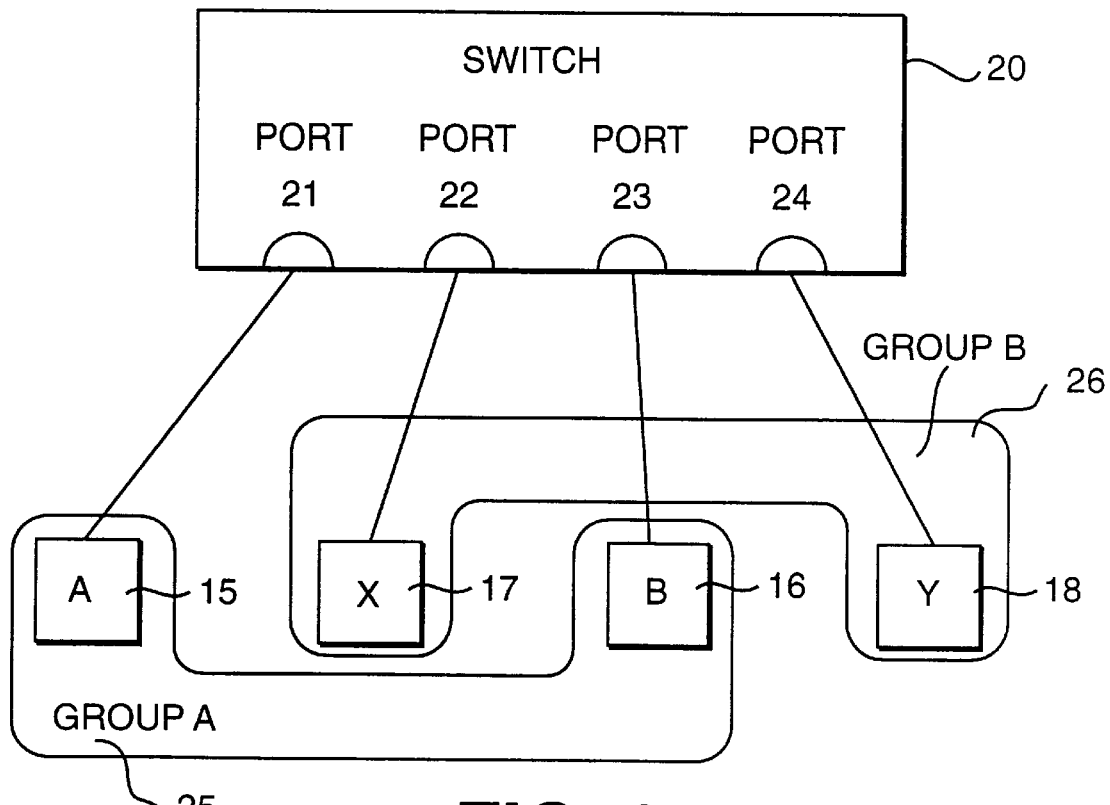
FIG. 8 is a schematic view of a typical switch-connected virtual network configuration.
Figures 9, 11:
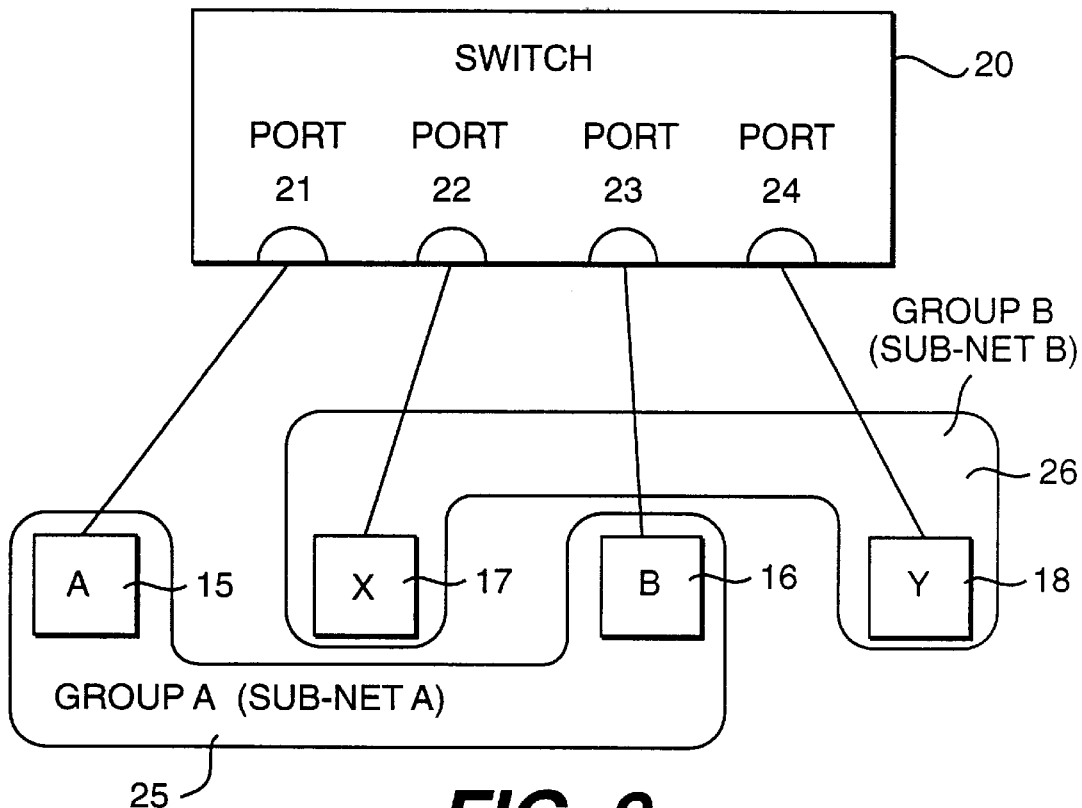
FIG. 9 is a schematic view of a typical switch-connected virtual network configuration comprising sub-nets.
FIG. 11 is an explanatory view of an address managing table.

For the embodiments according to the present invention, as shown in FIG. 8, the hosts are divided into two logical segments: hosts A15 and B16 making up a group A25, and hosts X17 and Y18 constituting a group B26.

Figure 10:
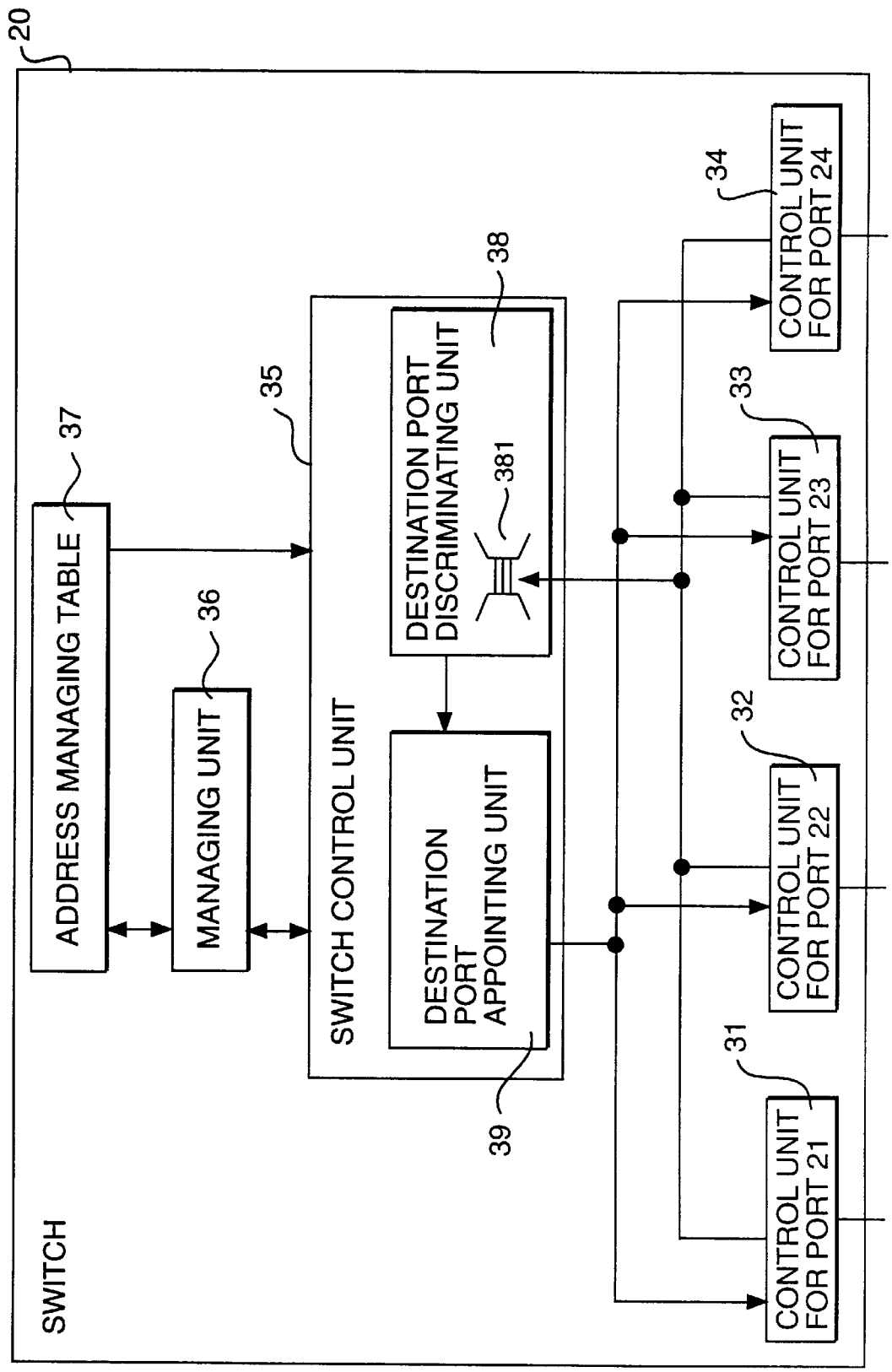
FIG. 10 is a block diagram of a conventional switch.
Figure 12:
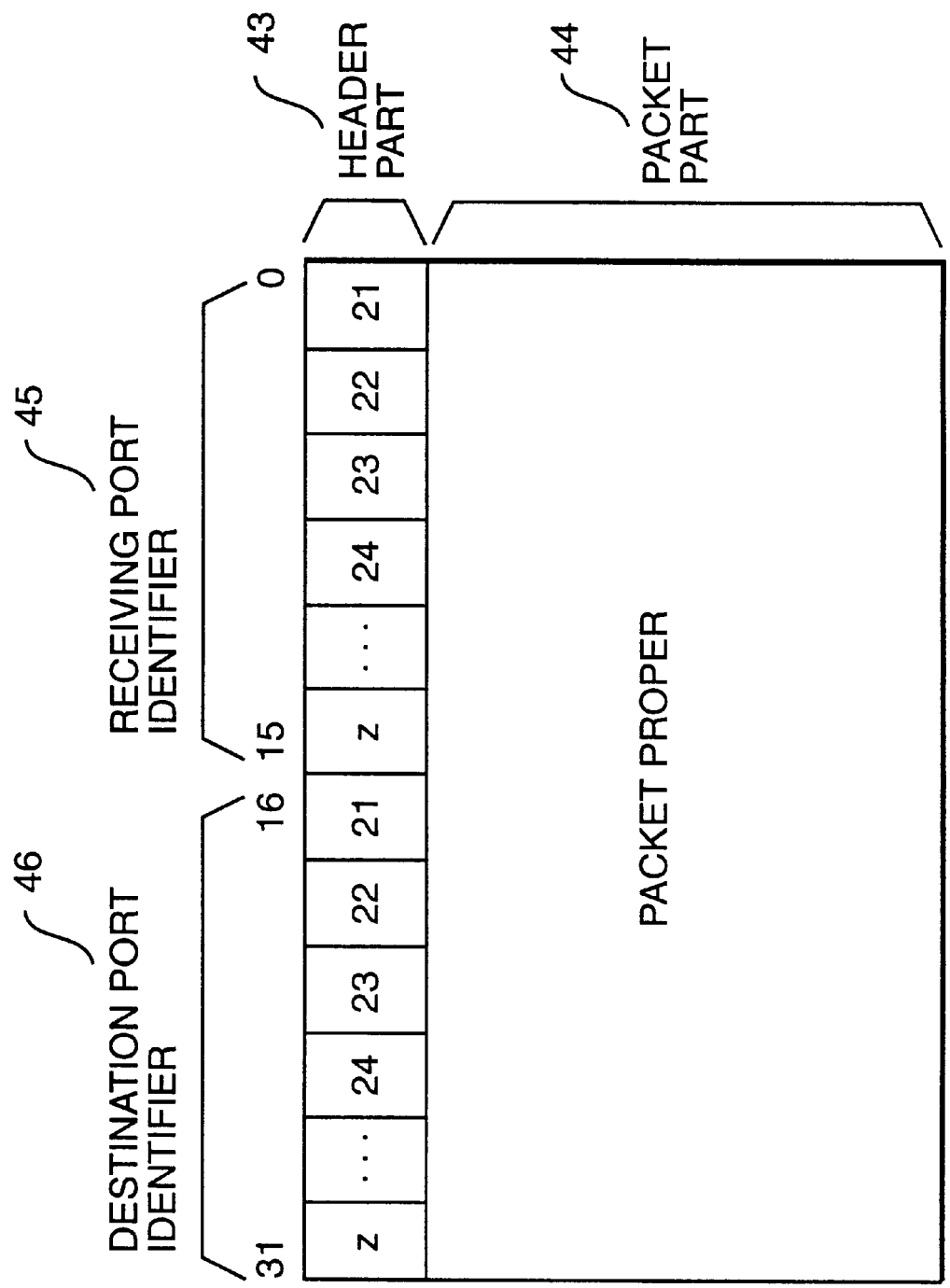
FIG. 12 is a schematic view of a packet used inside the switch.
Figure 13:
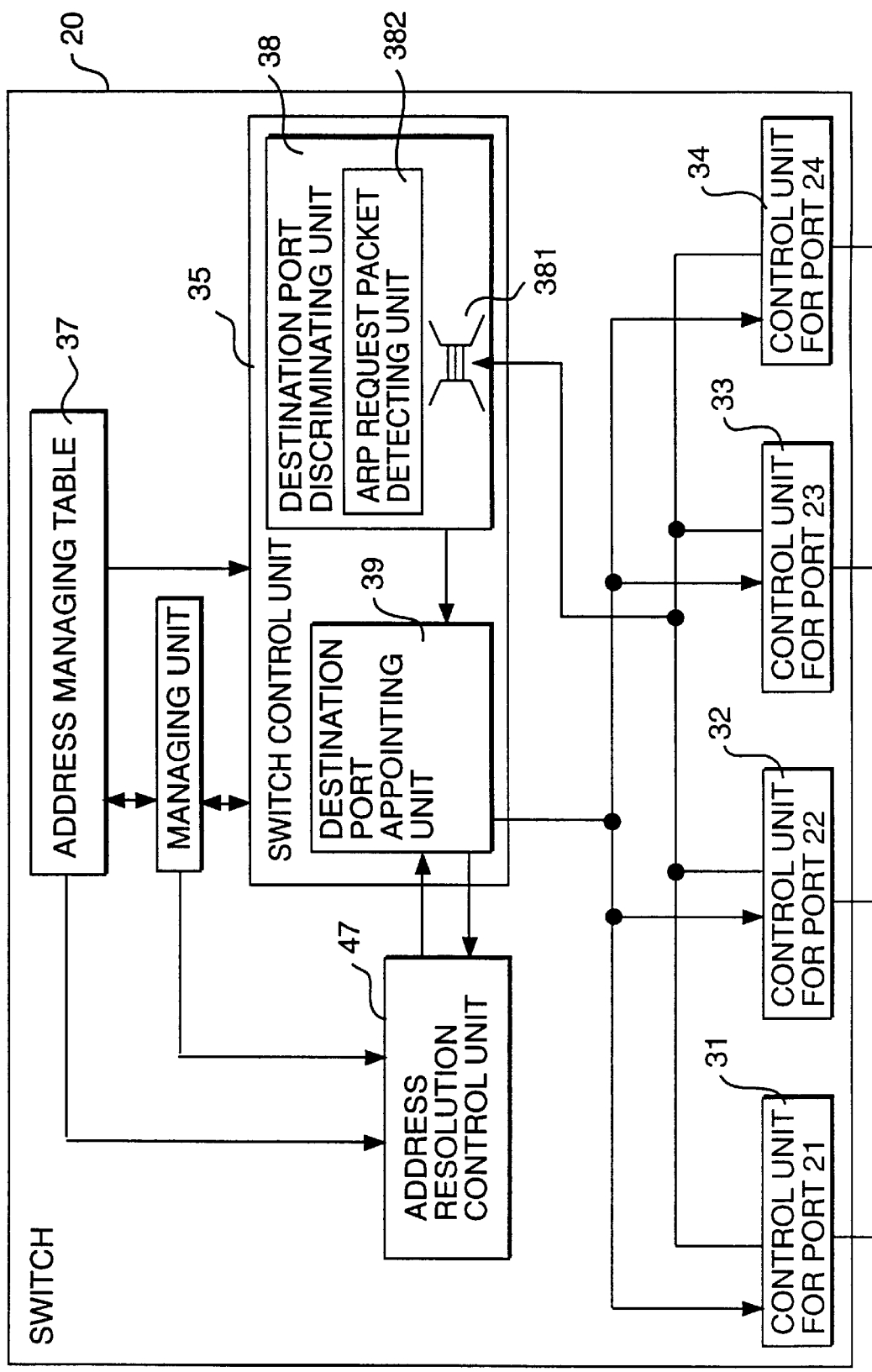
FIG. 13 is a block diagram of a switch according to the present invention.

FIG. 13 depicts an overall constitution of the switch 20 for use with the embodiments. As mentioned above, the setup of FIG. 13 is a variation of what is shown in FIG. 10 with the addition of the address resolution control unit 47 and with the ARP request packet detecting unit 382 included in the destination port discriminating unit 38. The ARP request packet detecting unit 382 recognizes a transferred packet and, finding the packet to be an ARP request packet, clears all bits in the destination port identifier 46 of the packet.

Figure 14:
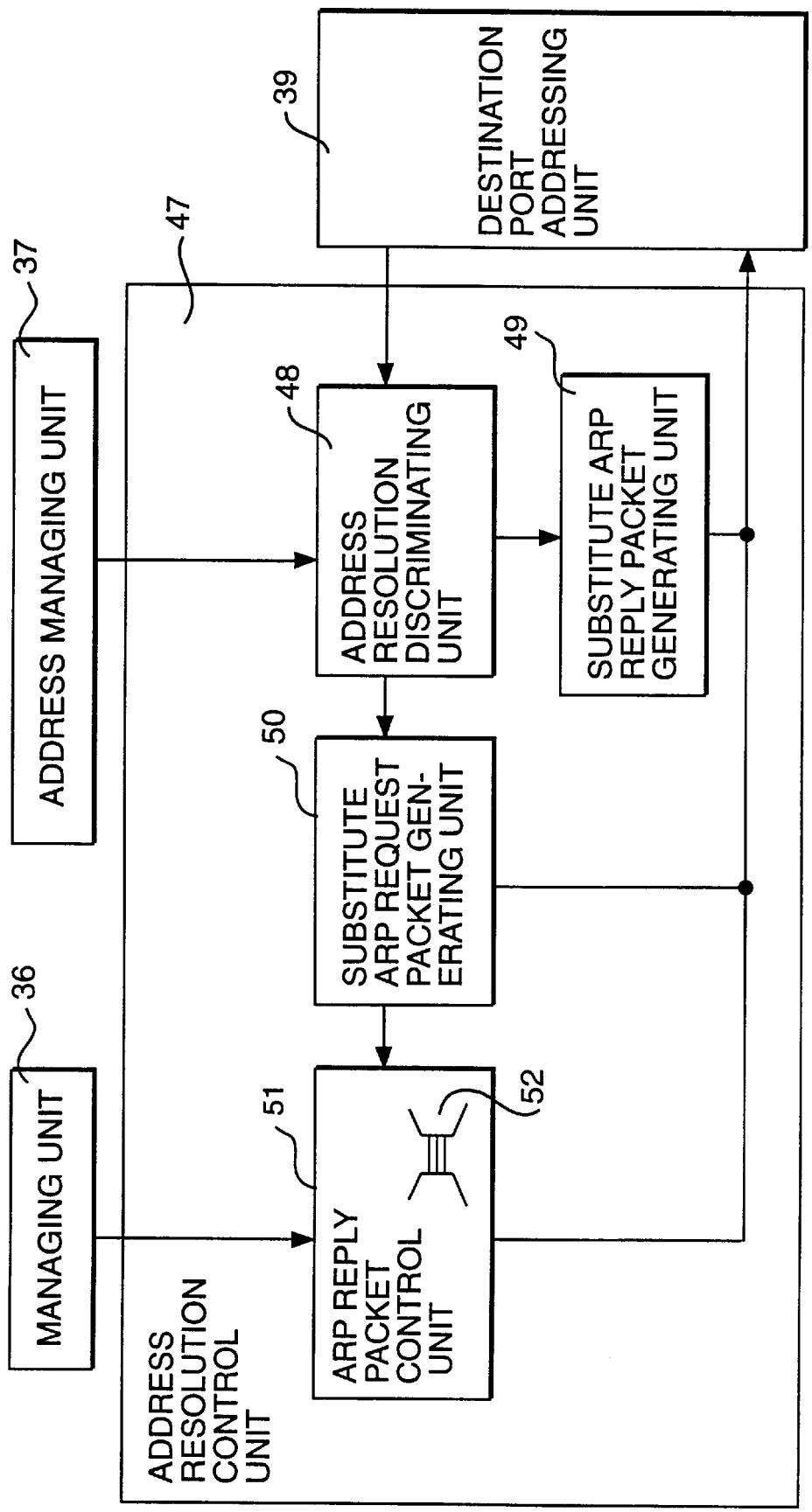
FIG. 14 is a block diagram of an address resolution control unit according to the present invention.
Figure 15:
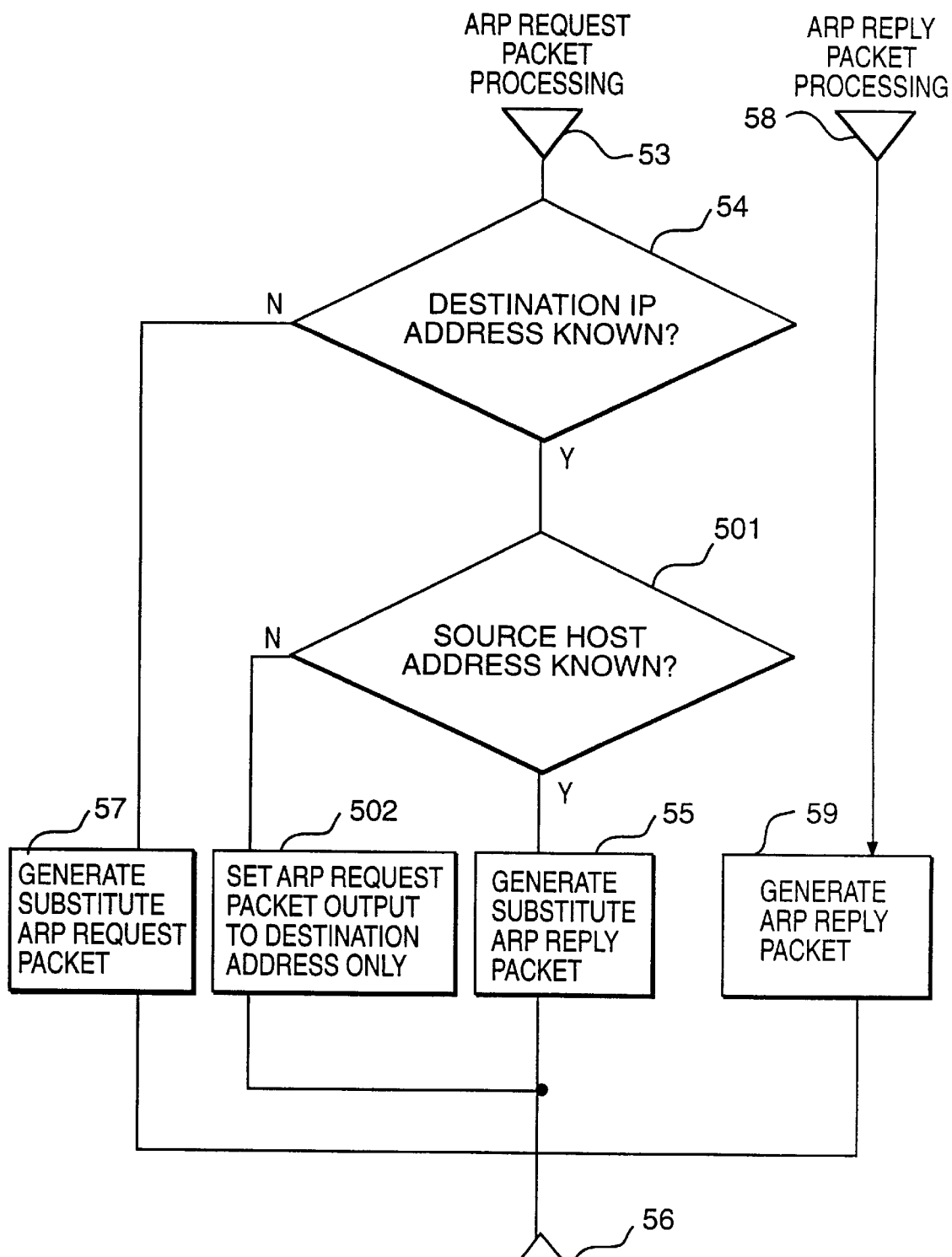
FIG. 15 is a flowchart of steps performed by the address resolution control unit of the present invention.

FIG. 14 is a block diagram of the address resolution control unit 47. The address resolution control unit 47 includes an address resolution discriminating unit 48, a substitute ARP reply packet generating unit 49, a substitute ARP request packet generating unit 50 and an ARP reply packet control unit 51. The ARP reply packet control unit 51 has an ARP reply packet receipt wait queue 52. The destination port appointing unit 39 transfers an ARP request packet to the address resolution discriminating unit 48, and receives packets generated by the address resolution discriminating unit 48, substitute ARP reply packet generating unit 49, substitute ARP request packet generating unit 50 or ARP reply packet control unit 51. The managing unit 30 transfers an ARP reply packet to the ARP reply packet control unit 51. The address resolution discriminating unit 48 references the address managing table 37.

Figure 16:
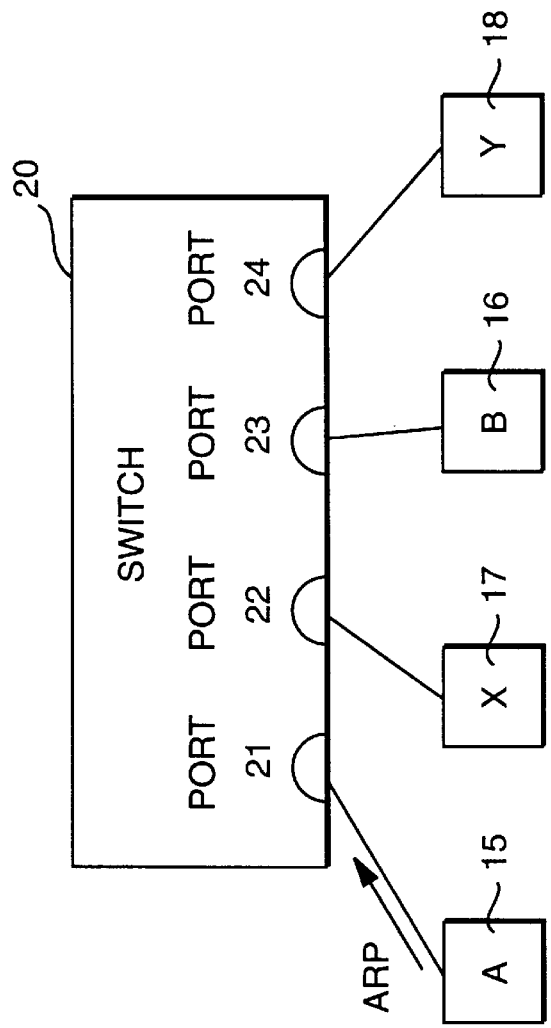
FIG. 16 is a schematic view illustrating how the ARP works with embodiments of the present invention.
Figure 17:
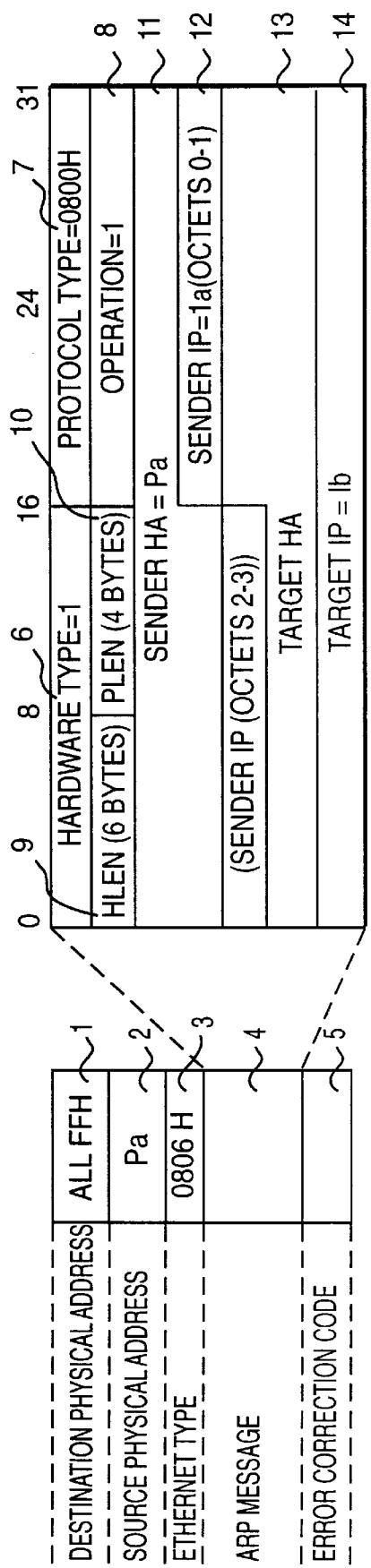
FIG. 17 is an explanatory view of the format of an ARP request packet for use with embodiments of the present invention.

The following is a description of how switch 20 operates to allow the host A15 to acquire the physical address of the host B16. FIG. 20 depicts an address managing table 37 for use with a first embodiment, wherein the table has the addresses of the hosts A15 and B16 set therein. In this case, the host A15 sends an ARP request packet to the switch 20 as shown in FIG. 16. The format of that ARP request packet is illustrated in FIG. 17. The settings of the format are as illustrated except for the physical address (target HA) 13 of the host B16.

Figure 18:
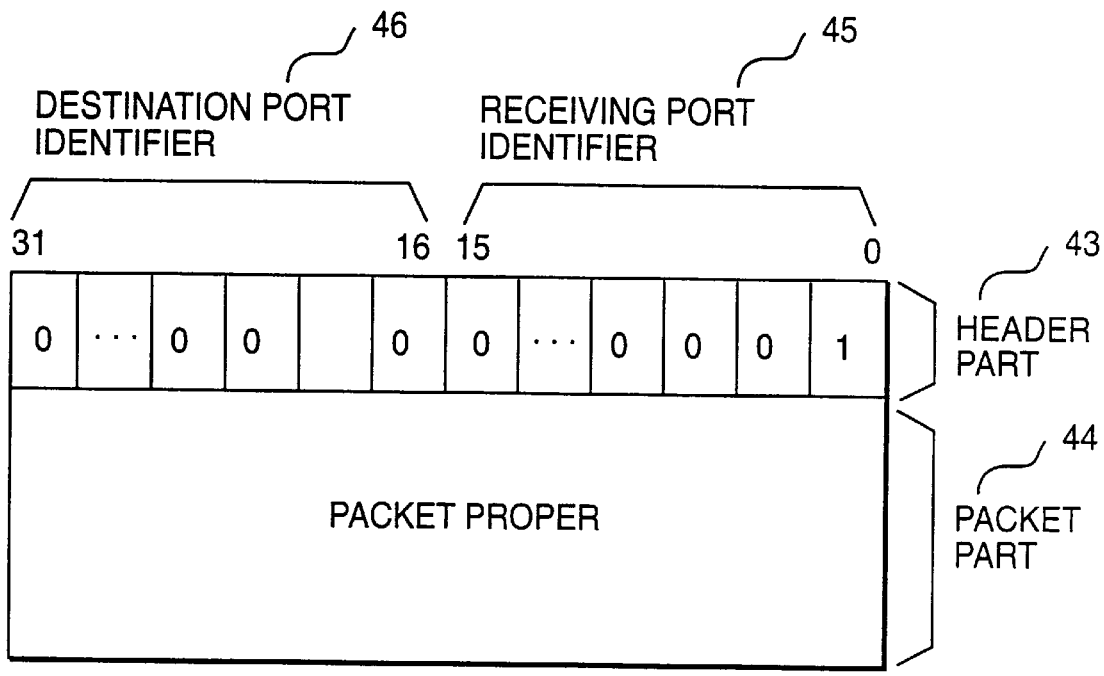
FIG. 18 is a schematic view of a packet used inside the switch according to the present invention.
Figure 19:
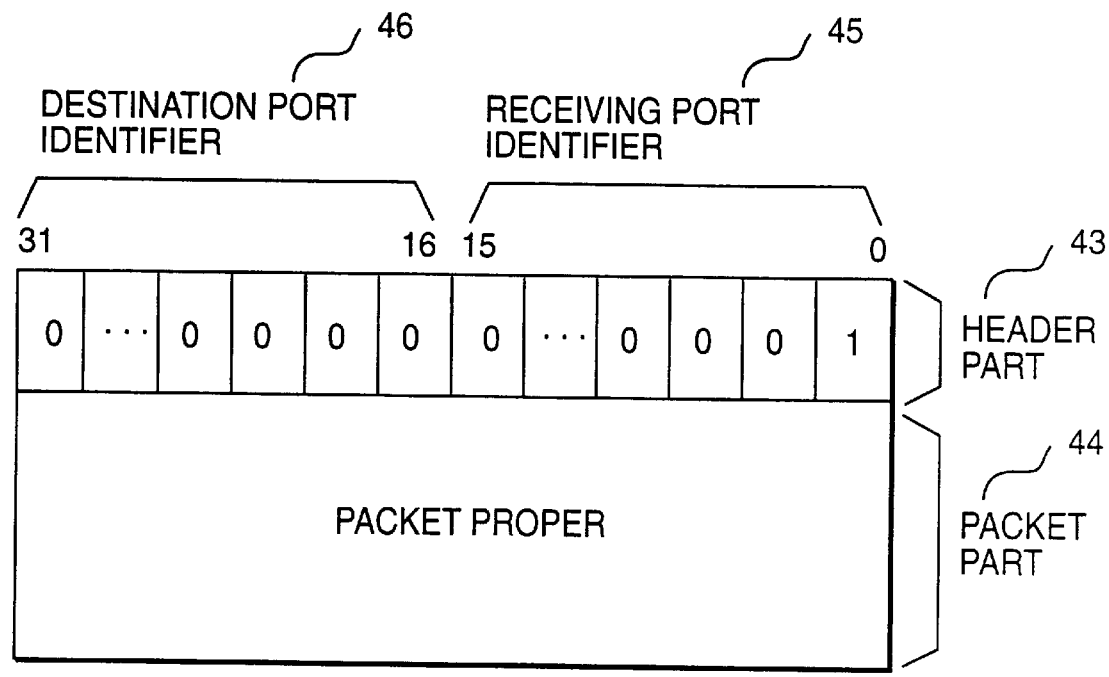
FIG. 19 is a schematic view of another packet used inside the switch according to the present invention.

The ARP request packet is received by the port 21 and forwarded to the control unit 31 for the port 21. The control unit 31, as shown in FIG. 18, prefixes a header part 43 to the received packet, sets the least significant bit in the receiving port identifier 45, and passes the packet on to the destination port discriminating unit 38. When the destination physical address 1 is found to be "all FFH" in the packet, the destination port discriminating unit 38 forwards the packet to the ARP request packet detecting unit 382. The ARP request packet detecting unit 382 checks the packet and, finding the packet to be an ARP request packet, clears to zero all bits in the destination port identifier 46 as shown in FIG. 19, before passing the packet on to the destination port appointing unit 39. With the bits in the destination port identifier 46 found to be all zero, the destination port appointing unit 39 transfers the packet to the address resolution control unit 47.

Figure 22:
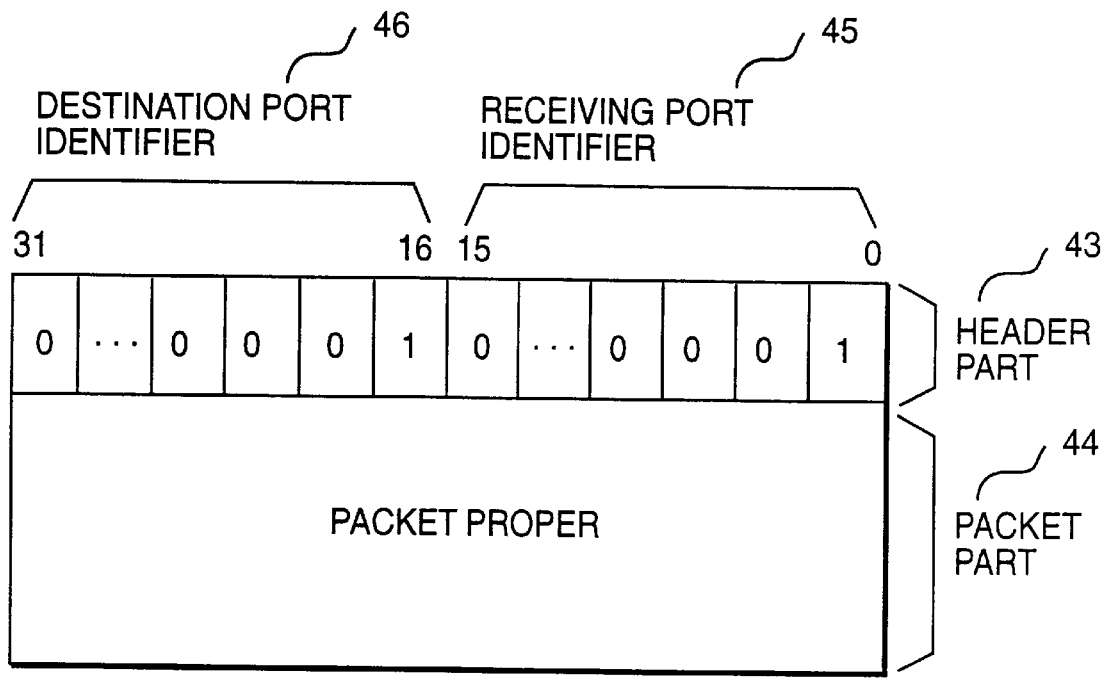
FIG. 22 is a schematic view of a packet used inside the switch of the first embodiment of the present invention.

In the address resolution control unit 47, the address resolution discriminating unit 48 first receives the packet and checks to see if the physical address of the host denoted by the destination IP address I$b$ (target IP) 14 of the packet is recorded in the address managing table 37 of FIG. 20. If the physical address of the host designated by the destination IP address I$b$ of the packet is found to be recorded in the address managing table 37, the address resolution discriminating unit 48 then checks to see if the source address of the packet is recorded in the address managing table 37 of FIG. 20. When the result of the check is affirmative, the address resolution discriminating unit 48 retrieves the physical address P$b$ of the host B16 from the address managing table 37, and passes the retrieved physical address P$b$ together with the packet on to the substitute ARP reply packet generating unit 49. Given the packet and the physical address P$b$, the substitute ARP reply packet generating unit 49 generates an ARP reply packet shown in FIG. 21. The substitute ARP reply packet generating unit 49 then copies the receiving port identifier 45 to the destination port identifier 46 as depicted in FIG. 22, before sending the packet to the destination port appointing unit 39.

Figure 23:
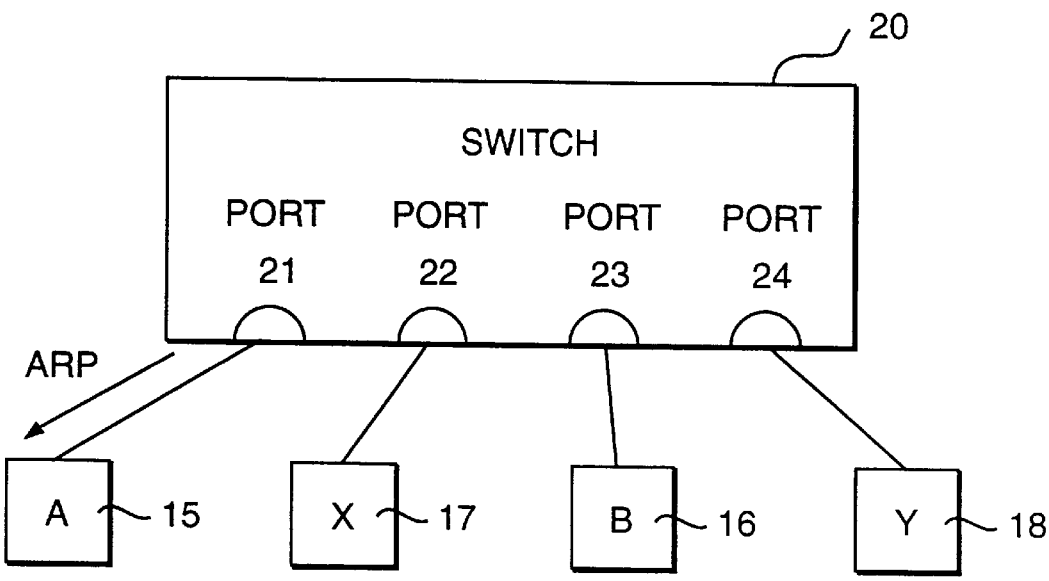
FIG. 23 is a schematic view showing how a substitute ARP reply packet is handled by the first embodiment of the present invention.

The destination port appointing unit 39 forwards the received packet to the port control unit 31 for the port 21 in accordance with the destination port identifier 46 of the packet. When forwarding the packet, the destination port appointing unit 39 removes the header part 43 from the packet. The ARP reply packet is sent from the port control unit 31 through the port 21 to the network, with the packet eventually reaching the host A15 that transmitted the ARP request packet as illustrated in FIG. 23. On receiving the ARP reply packet thus returned, the host A15 acquires the physical address P$b$ of the host B16 from the ARP message 4 in the packet.

FIG. 24 shows an address managing table 37 for use with a second embodiment, wherein the table does not include the address of the host B16. The second embodiment works as follows: the host A15 first sends an ARP request packet to the switch 20 as shown in FIG. 16. The format of that ARP request packet is illustrated in FIG. 17. The settings of the format are as illustrated except for the physical address (target HA) 13 of the host B16. The ARP request packet is received by the port 21 and forwarded to the control unit 31 for the port 21. The port control unit 31, as depicted in FIG. 18, prefixes a header part 43 to the received packet, sets the least significant bit in the receiving port identifier 45, and passes the packet on to the destination port discriminating unit 38. When the destination physical address 1 is found to be "all FFH" in the packet, the destination port discriminating unit 38 forwards the packet to the ARP request packet detecting unit 382. The ARP request packet detecting unit 382 checks the packet further and, finding the packet to be an ARP request packet, clears to zero all bits in the destination port identifier 46 as shown in FIG. 19, before passing the packet on to the destination port appointing unit 39. With the bits in the destination port identifier 46 found to be all zero, the destination port appointing unit 39 transfers the packet to the address resolution control unit 47.

Figure 26:
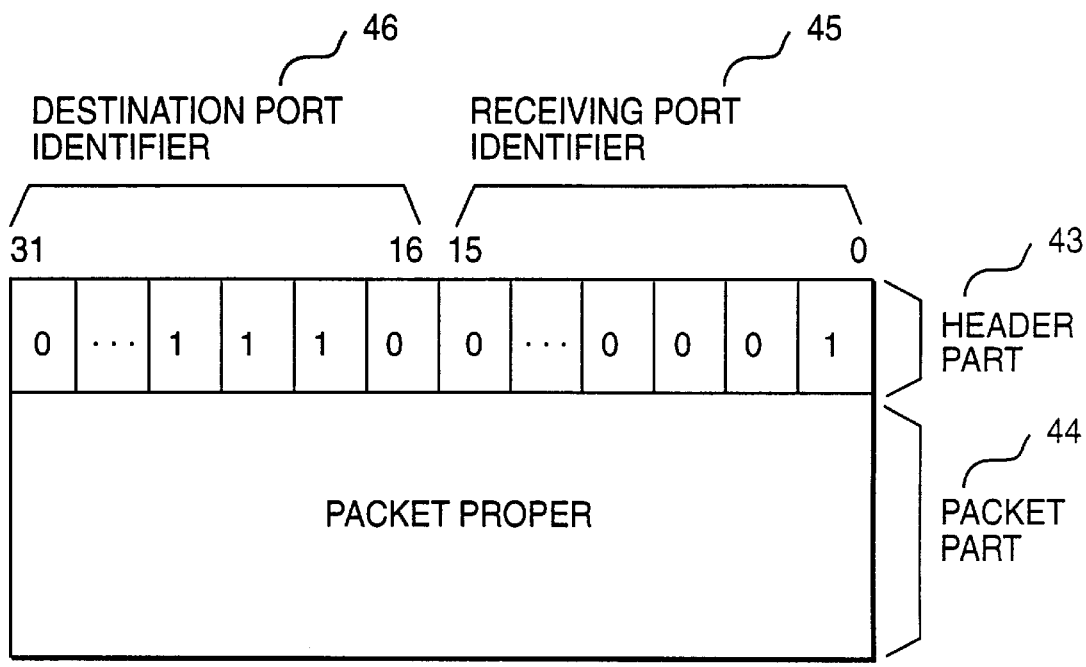
FIG. 26 is a schematic view of a packet used inside the switch of the second embodiment of the present invention.

In the address resolution control unit 47, the address resolution discriminating unit 48 first receives the packet and checks to see if the physical address of the host denoted by the destination IP address I$b$ (target IP) 14 of the packet is recorded in the address managing table 37 of FIG. 24. When the physical address of the host denoted by the destination IP address 14 of the packet is not found to be recorded in the address managing table 37, the address resolution discriminating unit 48 passes the packet on to the substitute ARP request packet generating unit 50. The substitute ARP request packet generating unit 50 makes a copy of the received packet and puts the original packet into the ARP reply packet receipt wait queue 52. The substitute ARP request packet generating unit 50 substitutes P$z$ for the source physical address 2 and I$z$ for the sender HA field 11 of the copied packet as shown in FIG. 25, and sets "1" to the second through the fourth least significant bits in the destination port identifier 46 as depicted in FIG. 26. The packet thus modified is transferred to the destination port appointing unit 39.

Figure 27:
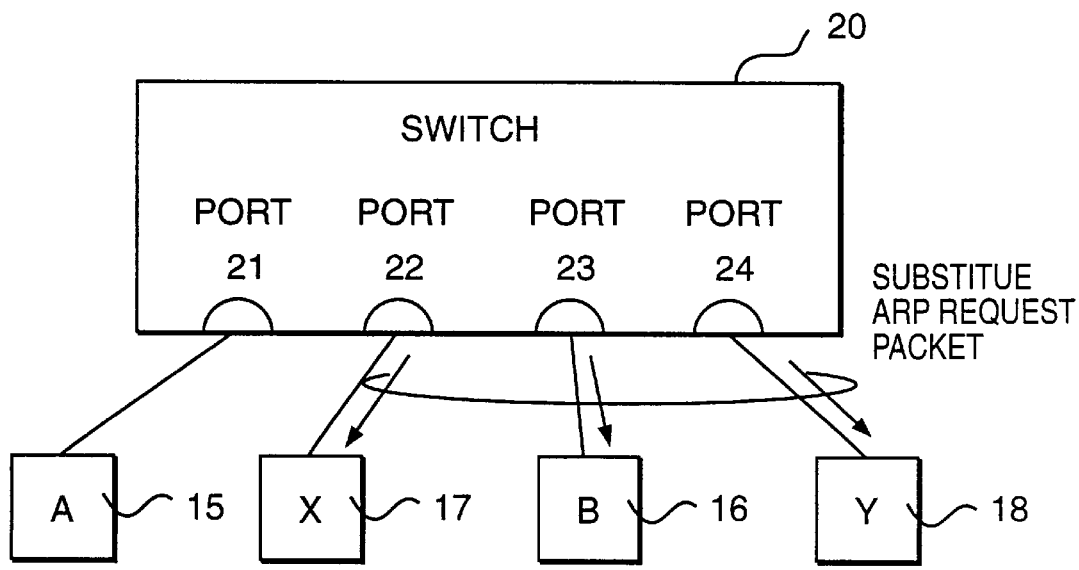
FIG. 27 is a schematic view depicting how substitute ARP request packets are handled by the second embodiment of the present invention.
Figure 28:
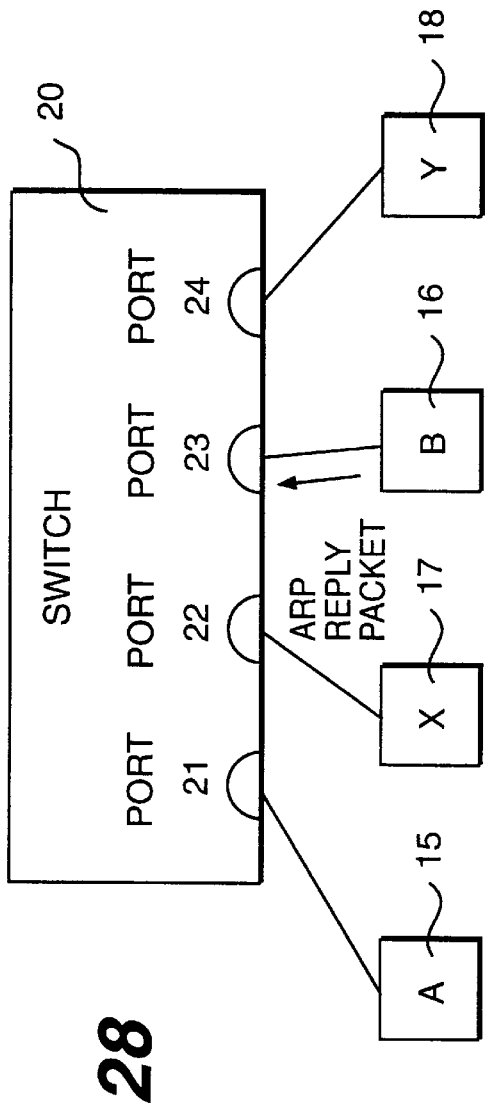
FIG. 28 is a schematic view indicating how an ARP reply packet is handled by the second embodiment of the present invention.
Figure 29:
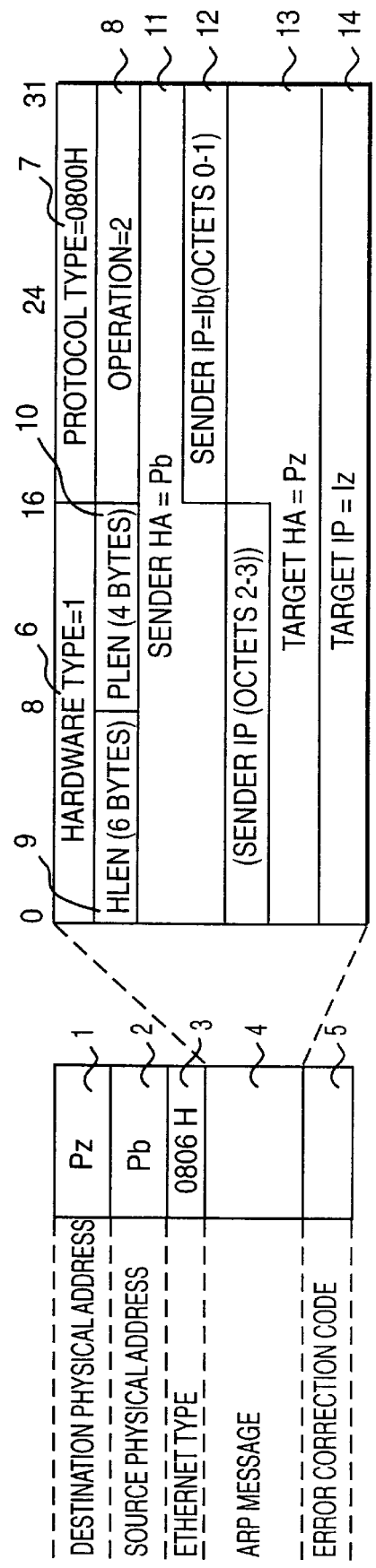
FIG. 29 is an explanatory view of the format of a substitute ARP request packet for use with the second embodiment of the present invention.

The destination port appointing unit 39 forwards the received packet to the control units 32 through 34 for the ports 22 through 24 in accordance with the destination port identifier 46. Upon forwarding the packet, the destination port appointing unit 39 removes the header part 43 from the packet. The port control units 32 through 34 in turn send the substitute ARP request packets via the ports 22 through 24 to their respective networks, as shown in FIG. 27. While the hosts B16, X17 and Y18 all receive the substitute ARP request packets, only the host B16 returns an ARP reply packet to the switch 20, as illustrated in FIG. 28. The format of that ARP reply packet is shown in FIG. 29. The physical address P$b$ of the host B16 is set in the sender HA field 11 of the format. The switch 20 receives the ARP reply packet through the port 23 and transfers the packet to the control unit 33 for the port 23.

Figures 30, 31:
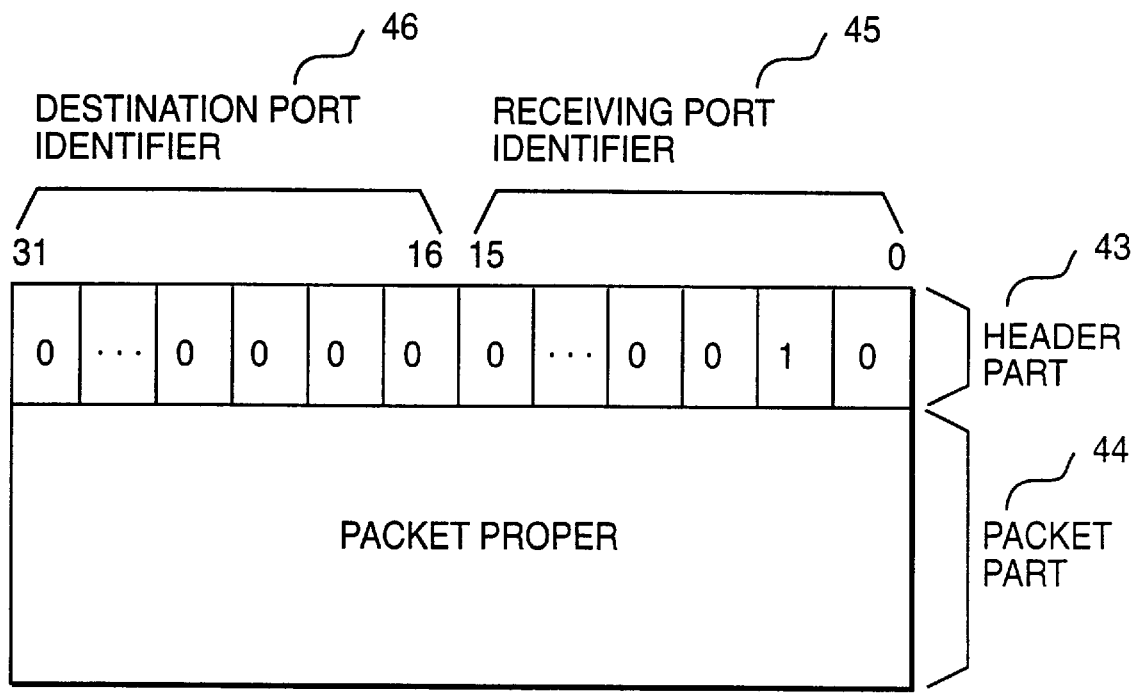
FIG. 30 is a schematic view of a packet used inside the switch of the second embodiment of the present invention.
FIG. 31 is an explanatory view of an address managing table for use with the second embodiment of the present invention.

As shown in FIG. 30, the port control unit 33 prefixes a header part 43 to the packet, sets "1" to the second least significant bit in the receiving port identifier 45, and passes the packet on to the destination port discriminating unit 38. When the destination physical address 1 of the received packet is found to match the address P$z$ of the own switch 20, the destination port discriminating unit 38 sets "1" to the most significant bit in the destination port identifier 46 of the packet and forwards the packet to the destination port appointing unit 39. With the most significant bit in the destination port discriminating unit 46 found to be set, the destination port appointing unit 39 passes the packet on to the managing unit 36.

The managing unit 36 checks the contents of the packet, verifies that the packet is an ARP reply packet, and updates the address managing table 37 according to the contents of the ARP message 4 in the packet as shown in FIG. 31. The managing unit 36 then transfers the packet to the ARP reply packet generating unit 51 in the address resolution control unit 47. On receiving the packet, the ARP reply packet generating unit 51 searches the ARP reply packet receipt wait queue 52 for the packet having the format shown in FIGS. 17 and 19.

Figures 32, 33:
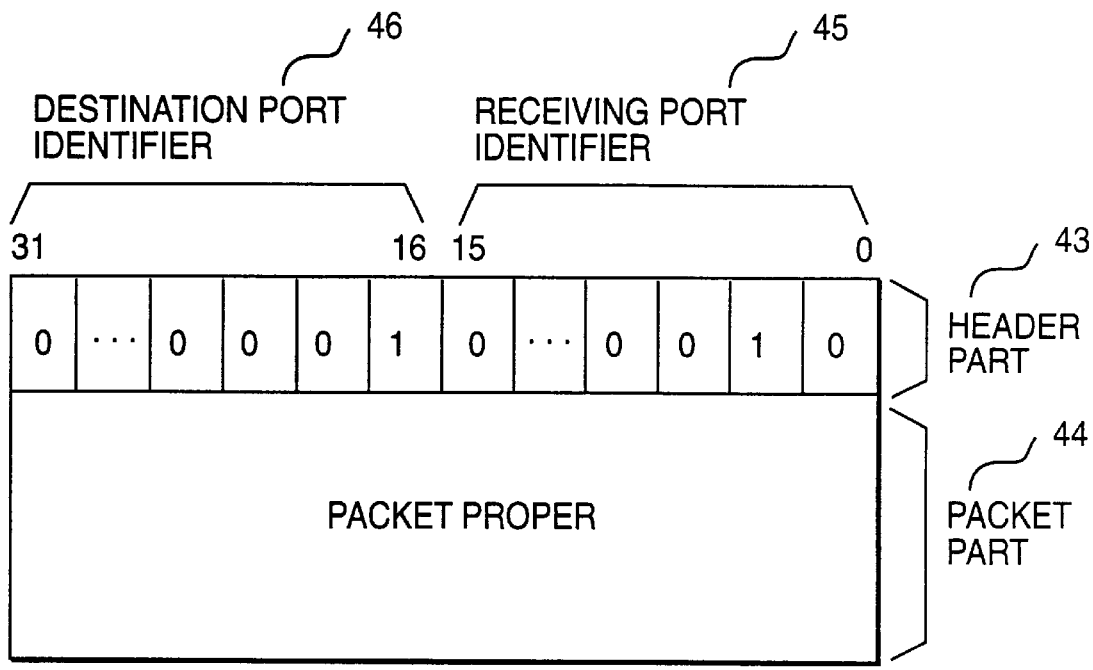
FIG. 32 is a schematic view of a packet used inside the switch of the second embodiment of the present invention.
FIG. 33 is an explanatory view of an address managing table for use with the third embodiment of the present invention.

With the appropriate packet retrieved, the ARP reply packet generating unit 51 takes the receiving port identifier 45, source physical address P$a$, sender HA field P$a$ and sender IP field I$a$; and establishes these settings respectively in the destination port identifier 46, destination physical address 1, target HA field 13 and target IP field 14 of the packet received from the managing unit 36, as illustrated in FIGS. 32 and 21. Then the ARP reply packet generating unit 51 transfers the packet to the destination port appointing unit 39. The destination port appointing unit 39 forwards the received packet to the control unit 31 for the port 21 in accordance with the destination port identifier 46 of the packet. On forwarding the packet, the destination port appointing unit 39 removes the header part 43 from the packet. The ARP reply packet is sent from the port control unit 31 to the network via the port 21, the packet eventually reaching the host A15 which transmitted the ARP request packet, as shown in FIG. 23. At this point, the host A15 obtains the physical address P$b$ of the host B16 from the ARP message 4 in the returned ARP reply packet.

FIG. 33 shows an address managing table 33 for use with a third embodiment of the invention, wherein the table having the address of the host B16 is set therein. The third embodiment works as follows: the host A15 first sends an ARP request packet to the switch 20 as shown in FIG. 16. The format of that ARP request packet is illustrated in FIG. 17. The settings of the format are as illustrated except for the physical address (target HA) 13 of the host B16. The ARP request packet is received by the port 21 and forwarded to the control unit 31 for the port 21. The port control unit 31, as depicted in FIG. 18, prefixes a header part 43 to the received packet, sets the least significant bit in the receiving port identifier 45, and passes the packet on to the destination port discriminating unit 38. When the destination physical address 1 is found to be "all FFH" in the packet, the destination port discriminating unit 38 forwards the packet to the ARP request packet detecting unit 382. The ARP request packet detecting unit 382 checks the packet further and, finding the packet to be an ARP request packet, clears to zero all bits in the destination port identifier 46 as shown in FIG. 19, before passing the packet on to the destination port appointing unit 39. With the bits in the destination port identifier 46 found to be all zero, the destination port appointing unit 39 transfers the packet to the address resolution control unit 47.

Figure 35:
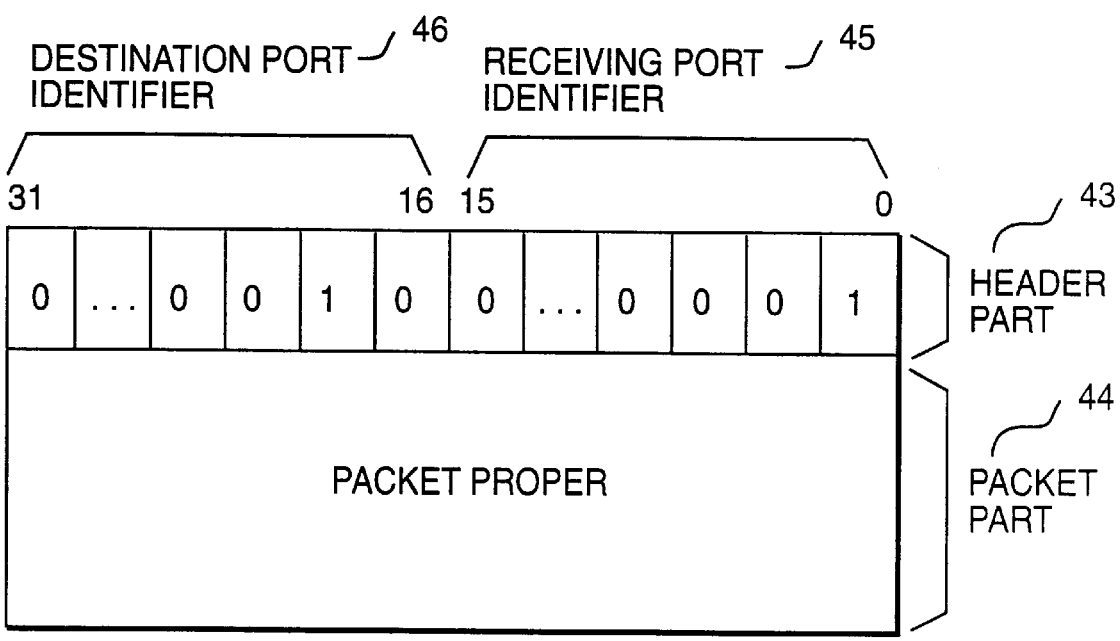
FIG. 35 is a schematic view of a packet used inside the switch of the third embodiment of the present invention.

In the address resolution control unit 47, the address resolution discriminating unit 48 first receives the packet and checks to see if the physical address of the host denoted by the destination IP address I$b$ (target IP) 14 of the packet is recorded in the address managing table 37 of FIG. 20. When the physical address of the host denoted by the destination IP address 14 of the packet is found to be recorded in the address managing table 37, the address resolution discriminating unit 48 checks to see if the source address of the packet is recorded in the address managing table of FIG. 20. Because the packet source address is not found in the address managing table 37, the address resolution discriminating unit 48 searches the table 37 for the port to which the host B16 is connected. With the port detected, the address resolution discriminating unit 48 sets to "1" the third least significant bit in the destination port identifier 46 as shown in FIG. 35, and passes the packet on to the destination port appointing unit 39.

Figure 34:
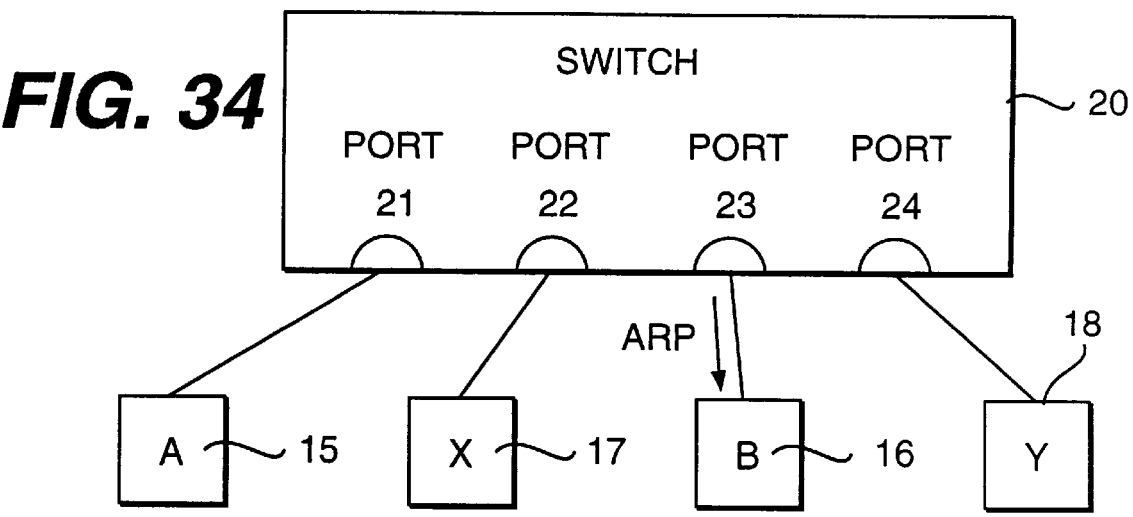
FIG. 34 is a schematic view showing how an ARP request packet is handled by the third embodiment of the present invention.

The destination port appointing unit 39 transfers the received packet to the control unit 33 for the port 23 in accordance with the destination port identifier 46. When transferring the packet, the destination port appointing unit 39 removes the header part 43 from the packet. The ARP request packet is sent from the port control unit 33 to the network through the port 23, the packet eventually reaching the host B16 as depicted in FIG. 34. Upon receipt of the ARP request packet, the host B16 places onto the network an ARP reply packet in which the physical address P*b* of the host B16 is set as shown in FIG. 21. The switch 20 receives the ARP request packet through the port 23. The port control unit 33 prefixes a header part 43 to the received packet, sets to "1" the third least significant bit in the receiving port identifier 45, and passes the packet on to the destination port discriminating unit 38.

Figure 36:
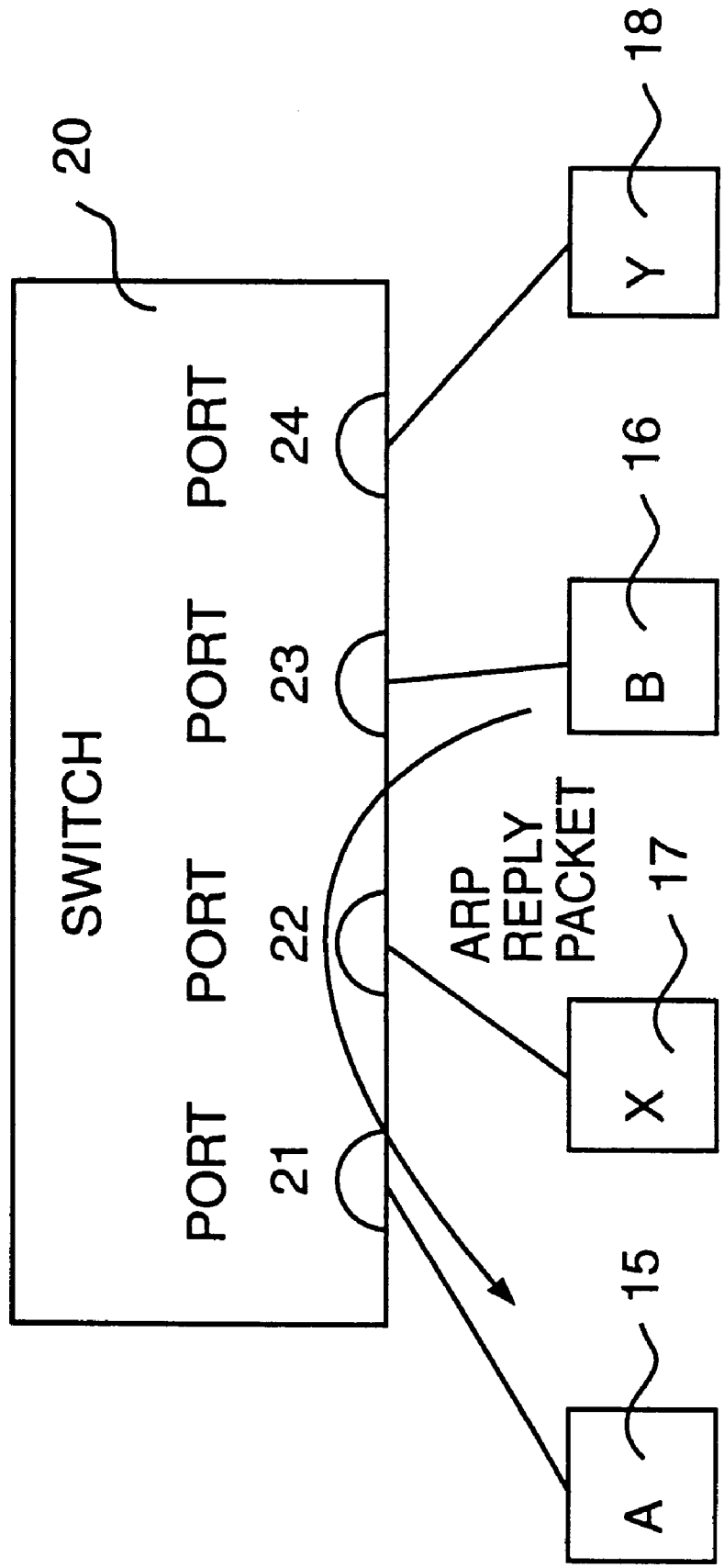
FIG. 36 is a schematic view depicting how an ARP reply packet is handled by the third embodiment of the present invention.

Based on the destination physical address 1 (Pa), the destination port discriminating unit 38 searches the address managing table 37 for the destination port. With the destination port detected, the destination port discriminating unit 38 sets to "1" the least significant bit in the destination port identifier 46 as indicated in FIG. 32, and sends the packet to the destination port appointing unit 39. The destination port appointing unit 39 transfers the received packet to the control unit 31 for the port 21 in accordance with the destination port identifier 46. On transferring the packet, the destination port appointing unit 39 removes the header part 43 from the packet. The ARP reply packet is sent from the control unit 31 to the network through the port 21, the packet eventually reaching the host A15 which transmitted the ARP request packet, as illustrated in FIG. 36. At this point, the host A15 acquires the physical address P*b* of the host B16 from the ARP message 4 in the ARP reply packet thus returned.

Advantageously, according to the present invention, the switch directly acknowledges ARP requests instead of having packets broadcast over the network. Reducing the packet flow over the network allows the network band to be effectively utilized. Because any given ARP request is sent over the physical cable of a given sub-net separately from the physical cable of any other sub-net, the security of data transfer is improved.

Given an ARP request, the switch broadcasts over the network a substitute ARP request in which the host address is replaced by that of the switch. This feature enhances data transfer security in that it prevents the host address from being released indiscriminately onto the network.

In addition, the switch sends the ARP request only to the destination host and thus allows the network band to be efficiently utilized. Because the ARP request is sent over the physical cable leading only to the target host and not to any other hosts, data transfer security is increased.

While the embodiments of the present invention were described above by functional blocks, one of ordinary skill in the art could easily implement these blocks in hardware to achieve the same functions. Detailed description of such hardware implementations are omitted in order to be clear and concise.

While the present invention has been described above in connection with the preferred embodiments, one of ordinary skill in the art would be enabled by this disclosure to make various modifications to these embodiments and still be within the scope and spirit of the present invention as set forth in the appended claims.

We claim:

1. A network connecting apparatus comprising:

a plurality of ports for connecting a plurality of networks;

a plurality of port control units for sending and receiving packets to and from said plurality of ports;

a switch control unit including a destination port discriminating unit and a destination port appointing unit and connected bidirectionally and separately to each of said plurality of port control units, said destination port discriminating unit discriminating the destination of a packet received from any one of said plurality of port control units, said destination port appointing unit receiving a packet from said destination port discriminating unit and appointing the port through which to send the received packet;

an address managing table for retaining the addresses of the hosts on the networks connected to said plurality of ports, said addresses being arranged for retrieval by said switch control unit;

a managing unit for controlling the apparatus as a whole and updating said address managing table; and an address resolution control unit capable of reading said address managing table, receiving an ARP request packet from said destination port appointing unit, receiving an ARP reply packet from said managing unit, and sending packets to said destination port appointing unit;

wherein the address information about the host of any one of the networks connected to said plurality of ports is not given to any other host.

2. A network connecting apparatus according to claim 1, wherein said address resolution control unit processes an ARP request packet received from any one of said plurality of ports without broadcasting said ARP request packet to any network.

3. A network connecting apparatus according to claim 1, wherein said address resolution control unit, upon receiving a first ARP request packet from any one of said plurality of ports, sends a second ARP request packet to an applicable network without directly sending said first ARP request packet to the applicable network, said second ARP request packet being newly generated by said address resolution control unit and originated by said network connecting apparatus; and wherein, when said network connecting apparatus receives an ARP reply packet returned by a host designated by said address resolution control unit, said address resolution control unit references information in the returned packet, generates accordingly an ARP reply packet with respect to said first ARP request packet received from one of said ports, and sends the ARP reply packet thus generated to the port through which said first ARP request packet was received.

4. A network connecting apparatus according to claim 1, wherein said address resolution control unit, upon receiving an ARP request packet from any one of said plurality of ports, replaces a source address of said ARP request packet with an address of its own network connecting apparatus and sends an address-modified ARP request packet to an applicable network without directly sending said ARP request packet to the applicable network.

5. A network connecting apparatus according to claim 1, wherein said address resolution control unit, upon receiving said ARP request packet from any one of said plurality of ports, searches said address managing table for a physical address of the host designated by the ARP request packet, generates according to a retrieved address an ARP reply packet with respect to said ARP request packet and sends the packet thus generated to the port through which said ARP request packet was received, without directly sending said ARP request packet to the applicable network.

6. A network connecting apparatus according to claim 1, wherein said address resolution control unit, upon receiving said ARP request packet from any one of said plurality of ports, searches said address managing table for the port to which the host designated by said ARP request packet is connected and sends said ARP request packet only to said port, without directly broadcasting said ARP request packet to the applicable network.

7. A switch used in a network connecting apparatus for connecting a plurality of hosts with one another, the switch comprising:

a plurality of control units for ports connected to the plurality of hosts, respectively;

a destination port discriminating unit having an ARP request packet detecting unit, wherein the ARP request packet detecting unit upon recognizing an ARP request packet, clears all bits in a destination port identifier of the ARP request packet; and an address resolution control unit which sends and receives ARP packets to and from the destination port discriminating unit.

8. A switch according to claim 7, further comprising an address managing table connected to the address resolution control unit, wherein if a physical address of a first host sending the ARP request packet is stored in the address managing table, and if a physical address of a second host sought by the first host sending the ARP request packet is also stored in the address managing table, then the physical address of the second host is sent to the first host by the switch.

9. A switch according to claim 7, further comprising an address managing table connected to the address resolution control unit, wherein if a physical address of a first host sending the ARP request packet is stored in the address managing table, and if a physical address of a second host sought by the first host sending the ARP request packet is not stored in the address managing table, the switch generates a substitute ARP request packet substituting its own address for the address of the first host.

10. A switch according to claim 9, wherein upon receiving an ARP reply packet from the second host, the switch sends the physical address of the second host to the first host.

11. A system comprising:

a plurality of hosts;

a plurality of ports connected to the plurality of hosts; and a switch having a plurality of port control units connected to the plurality of ports on a one to one basis;

wherein when a first host of the plurality of hosts attempts to obtain the physical address of a second host of the plurality of hosts via the switch, the switch substitutes its own physical address for the physical address of the first host in order to prevent the physical address of the first host from being revealed to other ones of the plurality of hosts.

12. A system according to claim 11, wherein the switch further comprises a switch control unit and an address resolution control unit.

13. A system according to claim 12, wherein the switch control unit includes a destination port discriminating unit and a destination port appointing unit, both of which are connected to each of the plurality of port control units.

14. A system according to claim 13, wherein the destination port discriminating unit includes an ARP request packet detecting unit that upon receipt of the ARP request packet clears all bits in a destination port identifier of the ARP request packet and forwards the ARP request packet to the address resolution control unit.

15. A system according to claim 12, wherein the address resolution control unit includes an address resolution discrimination unit, a substitute ARP reply packet generating unit, a substitute ARP request packet generating unit and an ARP reply packet control unit.

16. A system according to claim 14, wherein the address resolution control unit includes an address resolution discrimination unit, a substitute ARP reply packet generating unit, a substitute ARP request packet generating unit and an ARP reply packet control unit.

17. A system comprising:

a plurality of hosts;

switching means for connecting said plurality of hosts to one another in such a manner that a physical address of a first host can be obtained by a second host, while the physical address of the second host is prevented from being disclosed to any other host, wherein the switching means chances the physical address of the second host to another physical address in an address resolution request for obtaining the physical address of the first host; and wherein said switching means changes the physical address of the second host by substituting its own physical address for the physical address of the second host in the address resolution request.

18. A method of connecting a plurality of hosts on a network comprising the steps of:

interconnecting each of the plurality of hosts via a switch, the switch being provided with port control units connected to ports of each of the plurality of hosts;

controlling the switch such that an address of a first host can be obtained for a second host without revealing the address of the second host to each of the Plurality of hosts. wherein the switch changes the Physical address of the second host to another physical address in an address resolution request for obtaining the physical address of the first host; and wherein the step of controlling the switch includes the step of changing the physical address of the second host by substituting an address of the switch for the address of the second host prior to transmitting the address resolution request from the switch to the first host.

19. A method according to claim 18, wherein at approximately a time just prior to when the address of the switch is substituted for the address of the second host, the address of the second host is stored into an ARP reply packet wait queue.

20. A switch used in a network system including a plurality of hosts, the switch comprising:

a plurality of control units for ports connected to the plurality of hosts, respectively;

an address resolution request detecting unit which detects an address resolution request for obtaining a physical address of a first host issued by a second host; and an address resolution unit which sends the address resolution request and receives a reply to the address resolution request, wherein said address resolution unit changes the physical address of the second host in the address resolution request to another physical address before sending the address resolution request to the first host.

* * * * *